United States Patent [19]
Favor et al.

[11] Patent Number: 6,038,657
[45] Date of Patent: *Mar. 14, 2000

[54] SCAN CHAINS FOR OUT-OF-ORDER LOAD/STORE EXECUTION CONTROL

[75] Inventors: John G. Favor, San Jose; Amos Ben-Meir, Cupertino; Warren G. Stapleton, San Jose; Jeffrey E. Trull, San Jose; Mark E. Roberts, San Jose, all of Calif.

[73] Assignee: Advanced Micro Devices, Inc., Sunnyvale, Calif.

[ * ] Notice: This patent is subject to a terminal disclaimer.

[21] Appl. No.: 09/040,087

[22] Filed: Mar. 17, 1998

Related U.S. Application Data

[63] Continuation of application No. 08/740,119, Oct. 23, 1996
[60] Provisional application No. 60/005,069, Oct. 6, 1995, and provisional application No. 60/005,021, Oct. 10, 1995.

[51] Int. Cl.[7] .................................................... G06F 9/312
[52] U.S. Cl. ........................ 712/216; 712/214; 712/215; 712/217
[58] Field of Search .................................. 712/214, 215, 712/216, 217

[56] References Cited

U.S. PATENT DOCUMENTS

| H1291 | 2/1994 | Hinton et al. ............................ 395/800 |
| Re. 34,052 | 9/1992 | Heser et al. ............................. 712/217 |
| 4,180,861 | 12/1979 | Armstrong et al. .................... 712/224 |
| 5,095,458 | 3/1992 | Lynch et al. ............................ 708/713 |
| 5,404,470 | 4/1995 | Miyake .................................... 712/217 |
| 5,450,560 | 9/1995 | Bridges et al. ......................... 711/200 |
| 5,467,473 | 11/1995 | Kahle et al. .............................. 712/23 |
| 5,557,763 | 9/1996 | Senter et al. .............................. 712/23 |
| 5,559,975 | 9/1996 | Christie et al. ......................... 712/230 |
| 5,640,588 | 6/1997 | Vegesna et al. .......................... 712/23 |
| 5,659,782 | 8/1997 | Senter et al. .............................. 712/33 |
| 5,664,137 | 9/1997 | Abramson et al. ...................... 712/216 |
| 5,666,506 | 9/1997 | Hesson et al. .......................... 712/216 |
| 5,724,536 | 3/1998 | Abramson et al. ...................... 712/216 |
| 5,745,724 | 4/1998 | Favor et al. ............................. 712/213 |
| 5,745,726 | 4/1998 | Shebanow et al. ...................... 712/216 |
| 5,748,934 | 5/1998 | Lesartre et al. ......................... 712/216 |
| 5,754,812 | 5/1998 | Favor et al. ............................. 712/216 |

FOREIGN PATENT DOCUMENTS

| 0 305 639 | 3/1989 | European Pat. Off. . |
| 0 305 639 A2 | 3/1989 | European Pat. Off. . |
| 0 332 845 A2 | 9/1989 | European Pat. Off. . |
| 0 533 337 A1 | 3/1993 | European Pat. Off. . |
| 0 679 988 A1 | 11/1995 | European Pat. Off. . |
| 94 08287 | 4/1994 | WIPO . |
| WO 94/08287 | 4/1994 | WIPO . |

OTHER PUBLICATIONS

Halfhill, Tom R., "AMD K6 Takes On Intel P6," BYTE, UK Jan. 1996, pp. 67–68, 70, 72.

Anderson, George A., "Multiple Match Resolvers: A New Design Method," 8092 IEEE Transactions on computers, vol. c23, No. 12, Dec. 1974, pp. 1317–1320.

*Primary Examiner*—Meng-Ai T. An
*Assistant Examiner*—Nabil El-Hady
*Attorney, Agent, or Firm*—Skjerven Morrill MacPherson Franklin & Friel, L.L.P.

[57] ABSTRACT

Scan logic which tracks the relative age of stores with respect to a particular load (or of loads with respect to a particular store) allows at processor to hold younger stores until the completion of older loads (or to hold younger loads until completion of older stores). Embodiments of propagate-kill style lookahead scan logic or of tree-structured, hierarchically-organized scan logic constructed in accordance with the present invention provide store older and load older indications with very few gate delays, even in processor embodiments adapted to concurrently evaluate large numbers of operations. Operating in conjunction with the scan logic, address matching logic allows the processor to more precisely tailor its avoidance of load-store (or store-load) dependencies. In a processor having a load unit and a store unit, a load/store execution control system allows load and store instructions to execute generally out-of-order with respect to each other while enforcing data dependencies between the load and store instructions.

30 Claims, 14 Drawing Sheets

SCAN CHAINS FOR OUT-OF-ORDER LOAD/ STORE EXECUTION CONTROL

This application claims benefit of (1) U.S. Pat. No. 5,754,812, issued May 19, 1998, naming Favor, Ben-Meir, Stapleton, Trull, and Roberts as inventors, which is entitled to benefit of U.S. Provisional Application Ser. No. 60/005,069, filed Oct. 6, 1995 and U.S. Provisional Application Ser. No. 60/005,021, filed Oct. 10, 1995; and (2) U.S. Pat. No. 5,835,747, issued Nov. 10, 1998, naming Trull as inventor. U.S. Pat. Nos. 5,754,812 and 5,835,749 are incorporated herein, in their entirety, by reference and a cont of Ser. No. 08/740,119 filed Oct. 23, 1996.

CROSS-REFERENCE

The present invention is related to subject matter disclosed in the following U.S. patent applications:

1. U.S. patent application Ser. No. 08/592,207, filed Jan. 26, 1996, now abandoned, and the corresponding continuation-in-part U.S. Pat. No. 5,819,056, issued Oct. 6, 1998;
2. U.S. patent application Ser. No. 08/593,765, filed Jan. 26, 1996, now abandoned, and the corresponding continuation-in-part U.S. Pat. No. 5,819,056, issued Oct. 6, 1998;
3. U.S. Pat. No. 5,826,073, issued Oct. 20, 1998;
4. U.S. patent application Ser. No. 08/590,568, filed Jan. 26, 1996, now abandoned, and the corresponding continuation-in-part U.S. Pat. No. 5,799,165, issued Aug. 25, 1998;
5. U.S. Pat. No. 5,745,724, issued Apr. 28, 1998, and the corresponding continuation-in-part U.S. Pat. No. 5,881,261, issued Mar. 9, 1999;
6. U.S. patent application Ser. No. 08/592,210, filed Jan. 26, 1996, now abandoned, and the corresponding continuation-in-part U.S. Pat. No. 5,920,713, issued Jul. 6, 1999.
7. U.S. patent application Ser. No. 08/592,208, filed Jan. 26, 1996, now abandoned, and the corresponding continuation-in-part U.S. Pat. No. 5,794,803, issued Aug. 11, 1998;
8. U.S. patent application No. 08/592,151, filed Jan. 26, 1996, now abandoned, and the corresponding continuation-in-part U.S. Pat. No. 5,926,642, issued Jul. 20, 1999;
9. U.S. Pat. No. 5,712,760, issued Jan. 27, 1998, and the corresponding continuation-in-part Application Ser. No. 08/649,982, filed May 16, 1996; and
10. U.S. patent application Ser. No. 08/590,383, filed Jan. 26, 1996, now abandoned, and the corresponding continuation-in-part U.S. Pat. No. 5,901,668, issued May 11, 1999;

each of which is incorporated herein by reference, in its entirety.

BACKGROUND OF THE INVENTION

1. Field of the Invention

This invention relates to processors, and in particular to out-of-order execution control in a processor having multiple execution units.

2. Description of the Related Art

General purpose computers execute programs which are typically represented in executable form as ordered sequences of machine instructions. Human-readable representations of a program are converted to sequences of machine instructions for a desired target architecture, e.g., to object code for a processor conforming to the x86 processor architecture, in a process known as compilation. Typically, computer programs are designed, coded, and compiled with a simplifying assumption that the resulting object code will be executed in sequential order. However, despite this assumption, modem processor design techniques seek to exploit opportunities for concurrent execution of machine instructions, i.e., instruction parallelism.

To maximize computational throughput, superscalar techniques can be used to map instruction parallelism to multiple execution units. In contrast, pipelining techniques involve the exploitation of instruction parallelism within stages of a single functional unit or execution path. Superscalar techniques, which are known in the art of superscalar processor design, include out-of-order instruction issue, out-of-order instruction completion, and speculative execution of instructions.

Out-of-order instruction issue involves the issuance of instructions to execution units with little regard for the actual order of instructions in executing code. A superscalar processor which exploits out-of-order issue need only be constrained by dependencies between the output (results) of a given instruction and the inputs (operands) of subsequent instructions in formulating its instruction dispatch sequence. Out-of-order completion, on the other hand, is a technique which allows a given instruction to complete (e.g. store its result) prior to the completion of an instruction which precedes it in the program sequence. Finally, speculative execution involves the execution of an instruction sequence based on predicted outcomes (e.g., of a branch). Speculative execution (i.e., execution under the assumption that branches are correctly predicted) allows a processor to execute instructions without waiting for branch conditions to actually be evaluated. Assuming that branches are predicted correctly more often than not, and assuming that a reasonable efficient method of undoing the results of an incorrect prediction is available, the instruction parallelism (i.e., the number of instructions available for parallel execution) will typically be increased by speculative execution (see Johnson, Superscalar Processor Design, Prentice-Hall, Inc., New Jersey, 1991, pp. 63–77 for analysis).

Executing instructions out of sequential order, i.e., issuing and completing instructions out of sequential order, can increase a superscalar processor's performance by allowing the superscalar processor to keep multiple execution units operating in parallel and thereby improving throughput. Accordingly, a scheduler for a superscalar processor can improve overall performance by determining which instructions can be executed out-of-order and providing, or dispatching, those instructions to appropriate execution units. A scheduler for a superscalar processor must also handle interrupts and traps. Many processor architectures, including the x86 processor architecture, require that an architectural state be known just before or after an instruction generates an error, interrupt, or trap. This presents a difficulty when instructions are executed out of sequential order. Therefore, the scheduler must be able to undo instructions and reconstruct the system's state as if instructions executed in sequential order.

Architectural designs for exploiting the instruction parallelism associated with each of these techniques have been proposed in a variety of articles and texts. For a discussion, see Johnson, pp. 127–146 (out of order issue), pp. 103–126 (out-of-order completion and dependency), pp. 87–102 (branch misprediction recovery).

SUMMARY OF THE INVENTION

It has been discovered that loads and stores may generally be executed independently and out-of-order with respect to each other in a processor which provides an out-of-order load-store execution control system. Scan logic which tracks the relative age of stores with respect to a particular load (or of loads with respect to a particular store) allows a processor to hold younger stores until the completion of older loads (or to hold younger loads until completion of older stores). Embodiments of propagate-kill style lookahead scan logic or of tree-structured, hierarchically-organized scan logic constructed in accordance with the present invention provide store older and load older indications with very few gate delays, even in processor embodiments adapted to concurrently evaluate large numbers of operations. Operating in conjunction with the scan logic, address matching logic allows the processor to more precisely tailor its avoidance of load-store (or store-load) dependencies. In a processor having a load unit and a store unit, a load/store execution control system allows load and store instructions to execute generally out-of-order with respect to each other while enforcing data dependencies between the load and store instructions.

In one embodiment in accordance with the present invention, scan chain logic includes multiplexing logic and an AND-tree of propagate signals. The AND-tree supplies a plurality of carry-in signals in response to propagate signals. Such propagate signals are functions of operand type and operand state indications from corresponding entries in a scheduler array. The multiplexing logic is coupled to the AND-tree to receive the carry-in signals and is selective for a particular one of the carry-in signals corresponding to a load/store entry in the scheduler array.

In another embodiment in accordance with the present invention, a method for allowing first- and second-type operations to execute generally out-of-order with respect to each other while enforcing data dependencies between said first- and second-type operations includes maintaining an age ordered sequence of operation entries corresponding to operations, scanning the age ordered sequence of operation entries for a first-type operation entry. The scanning is from an oldest entry to at least a selected second-type operation entry thereof. The method further includes supplying, based on the scanning, a first-type older indication indicative of presence in the age ordered sequence, of an operation entry corresponding to an older first-type operation relative to a selected second-type operation, and responsive to the first-type older indication, selectively inhibiting execution of the selected second-type operation in a corresponding execution unit.

In still another embodiment, an apparatus includes an age ordered store for operation entries corresponding to operations, including first-type and second-type operations, scan chain means, and an execution unit. The scan chain means are for scanning the age ordered store for a first-type operation entry and supplying, based on the scanning, a first-type older indication indicative of presence in the age ordered store of an older first-type operation entry relative to a selected second-type operation entry thereof. The scan chain means scan from an oldest entry of the age ordered store to at least the selected second-type operation entry. In various alternative embodiments the scan chain means include lookahead and/or heirachical scan chain logic. In other alternative embodiments in accordance with the present invention, an apparatus includes additional instances of scan chain means.

BRIEF DESCRIPTION OF THE DRAWINGS

The present invention may be better understood, and its numerous objects, features, and advantages made apparent to those skilled in the art by referencing the accompanying drawings.

Use of the same reference symbols in different drawings indicates similar or identical items.

DETAILED DESCRIPTION OF THE PREFERRED EMBODIMENT(S)

Figure 2:
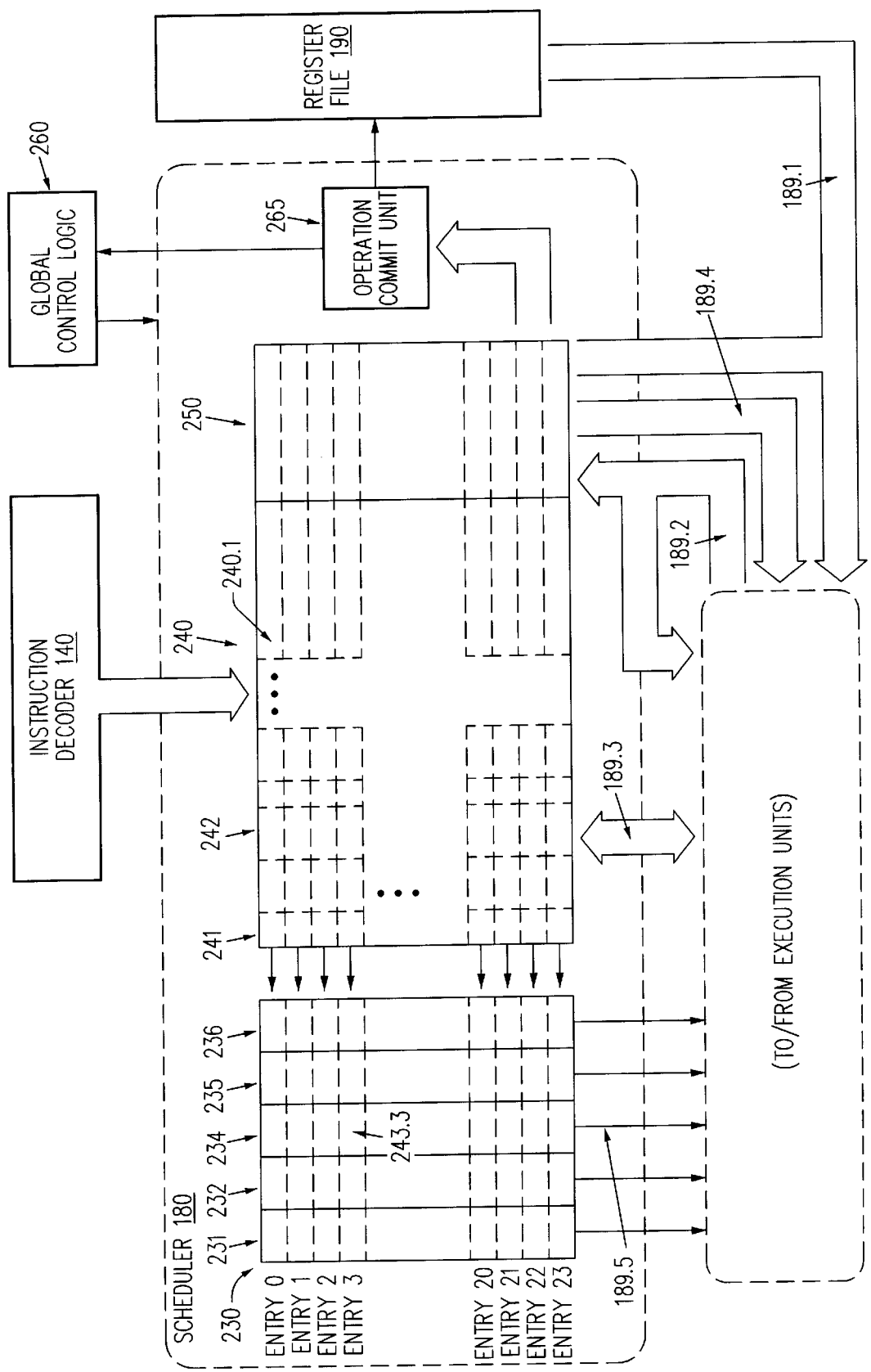
FIG. 2 is a block diagram depicting a scheduler constructed in accordance with an embodiment of the present invention.

FIG. 2 depicts an exemplary embodiment of scheduler 180 having 24 entries (shown as rows) wherein each entry is associated with a pending Op. Each entry includes a series of fields, collectively shown as scheduling reservoir 240, for representing static and dynamic data associated with a pending Op. In addition, scheduler 180 provides a series of specialized logic blocks, collectively shown as control logic 230, coupled to the entries of scheduling reservoir 240 to receive data associated with pending Ops. The specialized logic blocks (shown as columns 231, 232, 233, 235, and 236) of control logic 230 supply signals which control the sequencing of Op execution and the supply of operands to and distribution of results from the execution units. Control logic 230 includes issue selection logic 231, operand selection logic 232, load-store ordering logic 234, status flag handling logic 235, and self-modifying code support logic 536.

Issue selection logic 231 controls the selection of Ops from scheduling reservoir 240 for issue to available execution units during each cycle. Operand selection logic 232 identifies an appropriate source for operand data required by Ops which have been issued to execution units. Depending on data dependencies and sequencing of Ops within the execution engine 150, the appropriate source may be register file 190, a destination value field associated with another pending Op entry (destination value fields for scheduler entries are shown collectively as 250), or the result of a completed Op which is supplied on one of the result buses (shown collectively as result busses 272). Control signals supplied by issue selection logic 231 and operand selection logic 232 allow scheduler 180 to issue Ops from scheduling reservoir 240 to available execution units and to select the appropriate operand source for each Op issued.

Scheduler 180 includes a destination value field associated with each scheduler entry. Collectively these destination value fields are shown as 250. In conjunction with operand selection logic 232, destination value fields 250 implement a reorder buffer and implicit register renaming. Operand values associated with architectural registers of register file 190 are represented in destination value fields 250 and are typically supplied to execution units as register operand values via operand busses 271. However, operand values may instead be supplied from register file 190 if none of the destination value fields 250 represent a more recent register state (i.e., an as yet uncommitted register state). Results of completed Ops are supplied via result busses 272 to the destination value field of the scheduler entry associated with the completed Op. In addition, these results may also be supplied to execution units as operands for pending Ops. Results are forwarded via result busses 272. The design and operation of scheduler 180, including static and dynamic field definitions, are described in greater detail in a co-pending United States patent application entitled "Unified Multi-Function Operation Scheduler for Out-Of-Order Execution In A Superscalar Processor", Ser. No. 08/590,383 naming John G. Favor, Amos Ben-Meir and Warren G. Stapleton as inventors, filed on Jan. 26, 1996, now abandoned, and in the corresponding continuation-in-part U.S. Pat. No. 5,901,668, issued May 11, 1999, the detailed descriptions of which are hereby incorporated by reference.

The fields of a scheduling reservoir entry (illustratively, scheduling reservoir entry 240.1) contain information regarding an operation (Op) which is awaiting execution, which is in the process of being executed, or which is completed. Most of the fields of a scheduling reservoir entry are initialized when instruction decoder 130 loads a new Op into scheduling reservoir 240. However, other fields are later loaded or updated. For example, a state field (shown for each entry as field 242) is updated as the corresponding Op advances through stages of an execution pipeline. Storage fields that retain a value from the time an Op is loaded into scheduling reservoir 240 until retired from scheduler 180 are referred to as "static fields." Fields which can be updated with new values are referred to as "dynamic fields." In the context of load/store execution control, two fields, the type field 241 and the state field 242, bear further discussion.

A 3-bit field, Type[2:0], of each scheduling reservoir entry (shown in FIG. 2 as type field 241) specifies the Op type associated with the scheduling reservoir entry. Op type is particularly important for issue selection purposes (e.g., LdOps should issue to a load unit such as 150); however, load/store ordering control also makes use of type field 241. The following signals are decoded from type field 241:

| | |
|---|---|
| 000= | A Special operation not actually executed. |
| 010=LU | A LdOp executed by load unit 152. |
| 10x=SU | A StOp executed by store unit 153. |
| 101=ST | A StOp which references memory or at least generates a faultable address (i.e. not an LEA operation). |
| 11x=RU | A RegOp executed by register unit X 154 or possibly register unit Y 155. |
| 110=RUX | A RegOp executable ONLY by register unit X 154. |
| 111=RUY | A RegOp executable by register unit X 154 or register unit Y 155. |

A 4-bit field, State[3:0], of each scheduling reservoir entry (shown in FIG. 2 as type state 242) indicates the current execution state of an Op (S3, S2, S1, and S0 are alternate signal names for State[3:0].) Five possible states of type field 242 are encoded by a shifting field of ones as follows:

| | |
|---|---|
| 0000 | Unissued |
| 0001 | Stage 0 |
| 0011 | Stage 1 |
| 0111 | Stage 2 |
| 1111 | Completed |

Intermediate states correspond to the current execution stage for an Op corresponding to the entry in which the type field appears. The bits are updated (effectively by left shifting) as the Op is successfully issued or advances out of a stage. State[3:0] is also set to 1111 during abort cycles.

Scheduler Op Quad Organization

Scheduler 180 includes 24 entries in scheduling reservoir 240 and destination value fields 250 which are managed as a FIFO. Data corresponding to new Ops are loaded in at the "top," shift toward the "bottom" as execution of progresses, and are retired from the bottom of storage reservoir 240. To simplify control, scheduler 180 manages scheduling reservoir 240 and destination value fields 250 on an Op quad basis. Ops are loaded into, shifted through, and retired from scheduling reservoir 240 in groups of four. In this way, scheduler granularity matches the decode bandwidth of both the emcode ROM 142 and MacDec 141 of instruction decoder 140. Scheduler 180 therefore manages 24 Op entries as six Op quad entries in a six-deep, four-wide FIFO.

Despite the Op quad organization of scheduler 180, which is described in greater detail in a co-pending United States patent application entitled "Unified Multi-Function Operation Scheduler for Out-Of-Order Execution In A Superscalar Processor", Ser. No. 08/590,383 naming John G. Favor, Amos Ben-Meir and Warren G. Stapleton as inventors, filed on Jan. 26, 1996, now abandoned, and in the corresponding continuation-in-part U.S. Pat. No. 5,901,668, issued May 11, 1999, the detailed descriptions of which are hereby incorporated by reference, many aspects of scheduler operation are best understood by viewing the scheduling reservoir 240, destination value fields 250, and control logic 230 in the context of 24 entry granularity. For illustrative purposes, the discussion which follows is made in terms of a 24-entry scheduler 180, although those skilled in the art will recognize the advantages of Op quad granularity presented in the above-referenced co-pending application.

Operation (Op) Timing and Execution Stages

Each entry of scheduling reservoir 240 includes fields describing outstanding Ops. These fields store static information originally derived from the Ops fetched or decoded by instruction decoder 140 and also dynamic state information resulting from Op execution or characterizing the execution pipeline status of a given Op.

From a processor control perspective, scheduler 180 is an instruction sequence-ordered array of Op state information (scheduling reservoir 240) with associated control logic 230 generating control signals to issuing Ops from the array to respective execution units, to control Op execution through sequences of pipeline stages, and to eventually retiring Ops from the scheduler. As shown in FIG. 2, control logic 230 includes five specialized blocks of control logic (issue selection logic 231, operand selection logic 232, load-store ordering logic 234, status flag handling logic 235, and self-modifying code support logic 236), each having portions (illustratively portion 234.3 of load-store ordering logic 234) receiving information from corresponding entries of scheduling reservoir 240. Control logic blocks supply control signals to the execution units. For example, load-store ordering logic 234 supplies control signals to load unit 152 and store unit 153 via control lines represented collectively as 273.

The particular control signals supplied by control logic blocks of scheduling reservoir 240 depend on the state of fields in Op entries. In particular, the State[3:0] field indicates the progress of execution of associated operations. From a logical perspective, all state sequencing within the scheduler is single cycle in nature. State transition decisions are made each cycle based on the machine state during the cycle. The structure of scheduler 180 reflects the pipelined nature of Op execution. Scheduler 180 (and correspondingly each entry) can be divided into many distinct, rather independent logic portions, each of which is directly associated with a specific processing stage of a given type of operation or execution pipeline.

Figure 3:
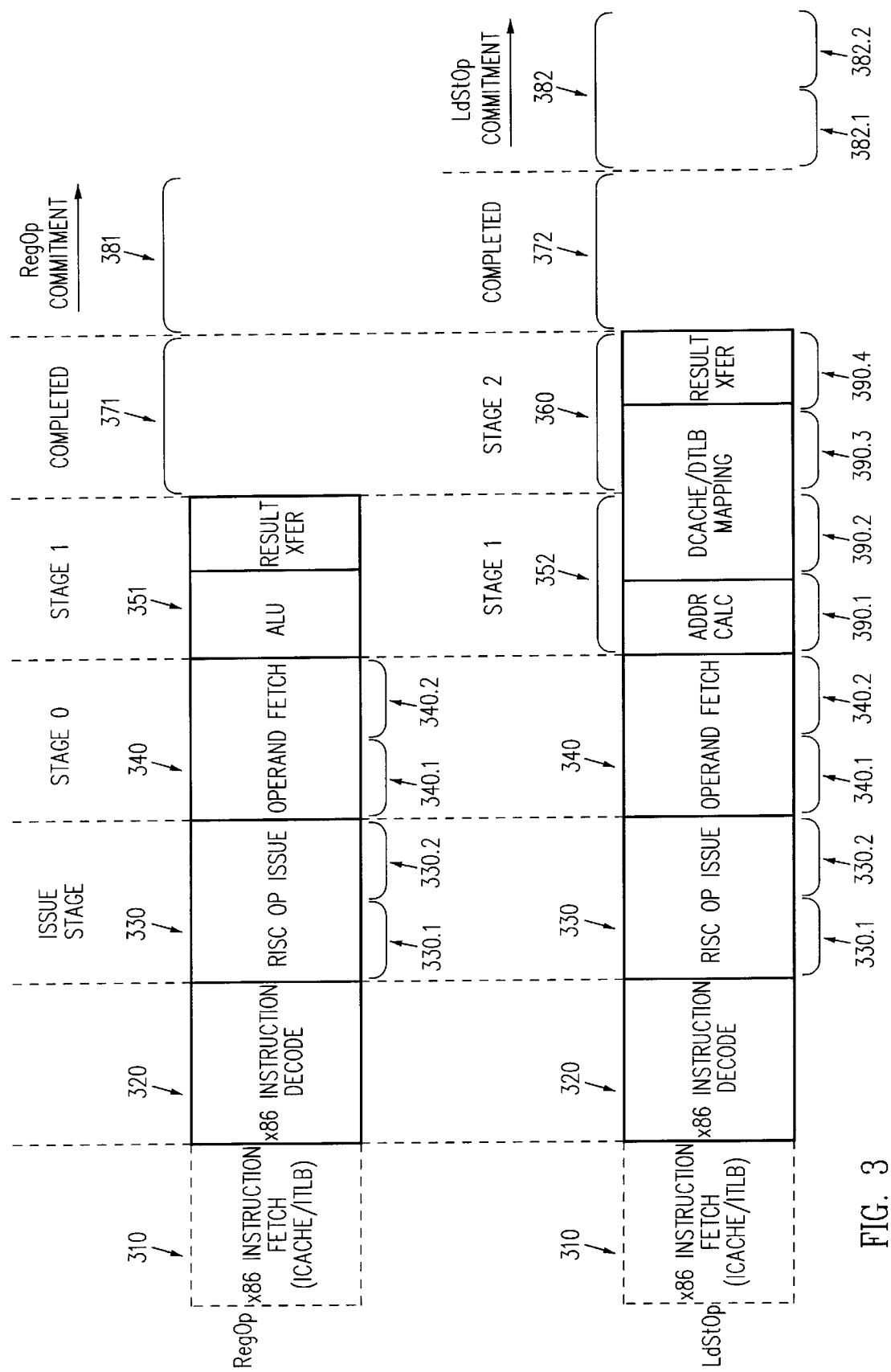
FIG. 3 is a pipeline staging diagram illustrating architectural stages in the execution of instructions in accordance with an embodiment of the present invention.

Pipeline staging of execution engine 150 is now described with reference to FIG. 3. Once an Op is loaded into execution engine 150, the Op goes through a three or four stage pipeline, and correspondingly transitions between four or five states represented by the field State[3:0] within the scheduler entry associated with the Op. Instruction fetch and decode are performed before execution engine 150, therefore the first scheduler-related pipeline stage is the issue stage. FIG. 3 shows pipeline staging for RegOps and LdStOps. Handling for other Ops, including BrOps, is described in a co-pending United States patent application entitled "Unified Multi-Function Operation Scheduler for Out-Of-Order Execution In A Superscalar Processor", Ser. No. 08/590,383 naming John G. Favor, Amos Ben-Meir and Warren G. Stapleton as inventors, filed on Jan. 26, 1996, now abandoned, and in the corresponding continuation-in-part U.S. Pat. No. 5,901,668, issued May 11, 1999, the detailed descriptions of which are hereby incorporated by reference.

Scheduler 180 exerts primary control over execution pipelines during the issue and operand fetch stages, 330 and 340. Processing within issue stage 330 and within operand fetch stage 340 can be broken down into two phases per stage, wherein each phase nominally occupying a half clock cycle. Issue stage 330 includes an issue selection phase and a broadcast phase, while operand fetch stage 340 includes an operand selection phase and operand forwarding phase.

Issue Stage

During the issue selection phase 330.1 of issue stage 330, scheduler 180 selects the next Ops to enter the pipelines associated with load unit 152, store unit 153, register unit X 154, and register unit Y 155 (four Op selections occur at once). During the broadcast phase 330.2 of issue stage 330, information about each of the register operands for each selected Op is broadcast to all scheduler entries and to external logic (including register file 190 and the execution units). In this way, the broadcast phase 330.2 sets up to locate operand values which may reside in one of the destination value fields 250 of scheduler 180 or in register file 190, or which may correspond to results to be produced on result busses 272 one of the execution units (e.g., load unit 152, store unit 153, or register units 154 and 155).

Operand Fetch Stage

During the operand selection phase 340.1 of operand fetch stage 340, scheduler 180 locates up to eight operand values (4 Ops*2 operands/Op) and determines the status of each operand value, i.e., whether a valid value is in fact available from the designated source. Based on this information, scheduler 180 determines which of the Ops in operand fetch stage 0 (stage 340) will advance into their respective execution pipes, i.e., into stage 1 (stage 350), following the operand forward phase. Advancement decisions are made independently for each Op and only operand dependencies need constrain the order with which operations are actually executed. Absent such data dependencies, Ops which issue to different execution units are generally processed through their respective pipelines in arbitrary order with respect to those Ops assigned to other execution units. One exception to this general rule involves the respective ordering of loads and stores (i.e., of LdOps and StOps) and is in greater detail discussed below.

LdStOp Execution Stages

The first two scheduler-related stages, the "operand issue" stage 330 and the "operand fetch" stage 340 are common to RegOps and LdStOps. Subsequent stages are the execution stages. RegOps include a single execution stage 350 because all RegOps execute in a single cycle. Furthermore, once a RegOp enters the execution stage, it always successfully completes and exits stage 350 at the end of that clock cycle. LdStOps, on the other hand, have two execution stages 352 and 360, during which address calculation, segment and page translation (and protection checking), and data cache accessing (in the case of LdOps) all take place. Unlike RegOps, LdStOps can be held up for arbitrary periods of time in either stage 360 or 370. Most hold ups appear in the second stage 370. Most commonly, hold ups in stage 370 result from data cache 170 misses, data TLB 171 misses, and page faults. Hold ups in stage 360 result from misaligned memory references and from stage 370 being occupied and blocked by an LdStOp not advancing to completion.

During the operand forward phase 340.2 of operand fetch stage 340, scheduler 180 transfers operand values from the designated sources via operand busses and/or result busses shown collectively in FIG. 2 as busses 271 and 272 to execution units such as load unit 152, store unit 153, register unit X 154, and register unit Y 155. The exemplary embodiment includes nine operand busses 271, eight of which provide operand values for operations in stage 0. Also in the exemplary embodiment, operand transfers occur regardless of whether values are valid, thereby simplifying control logic. If an operand value is invalid, it is ignored by the respective execution unit because the scheduler 180 does not advance the associated operation to stage 1. Immediate values for RegOps are handled as part of the register operand forwarding mechanism described above. In such cases, the immediate value is forwarded directly from the particular one of the destination value fields 250 of the scheduler 180 entries associated with the Op.

Displacement values are also transferred during operand forward phase 340.2, via displacement busses 189.4, to load unit 152 and store unit 153 (independent values to each unit). These displacements are 32-bit values and always come from the entries of scheduler 180. The selection of the source entry occurs during operand selection phase 340.1. When a LdOp or a StOp enters stage 1, load unit 152 and store unit 153 latch associated displacement and operand values.

Scheduler 180 implements the four-phase control mechanism (as described above) for providing the address operands and displacement; however, StOps require a store data operand in addition to address operands and displacement values. Scheduler 180 performs a four-phase process for obtaining the store data for a StOp. The StOp data obtaining process is similar to that described above; however the store data is obtained during execution stage 2 (370) of the store pipeline. The process for providing the store data is synchronized with stages 1 and 2 of the StOp and includes a selection phase 390.1 identifying the StOp in execution stage 1, a broadcast phase 390.2 transmitting information describing the source of a data operand, a data operand selection phase 390.3, and an data operand forwarding phase 390.4. In essence, store data is fetched in parallel with StOp execution; and the actual data value is obtained and provided to store queue 159 upon completion of StOp processing. If a valid store data value is not available, the StOp is held up in stage 2.

Load-Store Ordering Constraints

Just as a certain degree of execution ordering must be maintained between Ops which exhibit true data dependencies (as contrasted with mere contention for an architectural register which is avoided by scheduler 180 using register renaming), execution ordering must also be maintained between LdOps and StOps which read from (and write to) the same memory location.

In general, loads and stores may execute out-of-order with respect to each other; however, if a younger load and older store access the same memory location, the older store should supply the data for the younger load (i.e., the younger load should wait for the older store). In such a case, the store data is provided to the younger load via data cache 170. Similarly, an older load must complete before a younger store is allowed to write to the same memory location. In such a case, the older store must wait. A combination of control logic in scheduler 180 and in load and store units 152 and 153 enforces such load-store ordering constraints.

Load-Store Ordering Control

Figure 4:
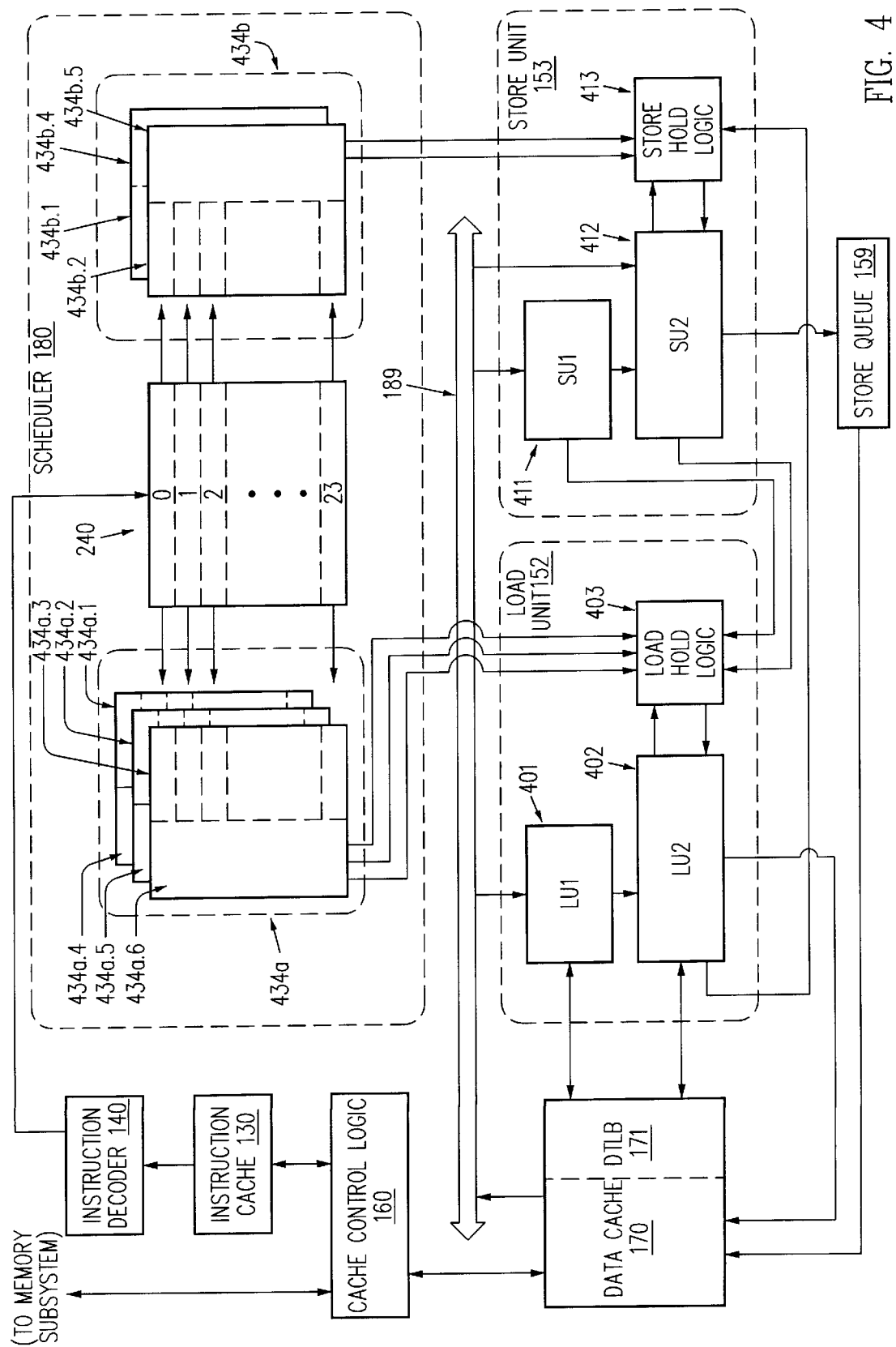
FIG. 4 is a block diagram of out-of-order load and store execution control components in accordance with an embodiment of the present invention.

In addition to the scheduler logic associated with operation issue and operand fetch, entries of scheduler 180 include load-store ordering logic 234 for providing out-of-order load-store execution control. Two portions of load-store ordering logic 234, which are respectively associated with load unit 152 and store unit 153, are shown in FIG. 4 as load ordering logic 434a and store ordering logic 434b. Together with load hold logic 403 and store hold logic 413 in the respective execution units, load-store ordering logic 234 enforces load-store execution ordering constraints.

Load Hold Logic

Focusing illustratively on load unit 152, load hold logic 403 checks for StOps in various pipe stages that are older than the LdOp in stage 2 (LU2 402) of load unit 152. In particular, load hold logic 403 checks for older StOps in stage 0, stage 1 (SU1 411), and stage 2 (SU2 412), i.e., stages 340, 352, and 360 of FIG. 3. Three signals (SC_SU2OLDER, SC_SU1OLDER, and SC_SU0OLDER), which are supplied to load hold logic 403 by load ordering logic 434a, signal an older StOp in stages 2, 1, and 0, respectively. More precisely, SC_SU0OLDER indicates the presence of an older StOp in stages of processing earlier than execution stages 1 and 2 (e.g., operand fetch stage 0 340 or issue stage 330). Load hold logic 403 also receives a partial memory addresses for the LdOp in stage 2 (LU2 402) of load unit 152 and selectively provides a hold signal (LU2_Hold) to LU2 402 under conditions now described.

An older StOp in stage 0 (or in an earlier stage) causes load hold logic 403 to unconditionally hold the current LdOp in stage 2 of load unit 152. On the other hand, an older StOp in stage 2 or stage 1, holds the current LdOp only if there is also a match between the memory addresses for the LdOp in stage 2 and older StOp. The following RTL describes the design and operation of load hold logic 403:

```
// LU2 Hold Logic;
// **************;
// LU2 Partial Address Match with SU pipe stage 2;
AddrMatch2 =
(LinAddr(9,3) == SU2_PageOffset (9, 3)) && (ByteMark &
SU2_ByteMark) &&
(LU2_SpecMem ^ SU2_SpecMem) && SU2_StV;
// LU2 Partial Address Match with SU pipe stage 1;
AddrMatch1 =
(LinnAddr(9,3) == SU1_LinAddr(9,3)) && (ByteMark &
SU1_ByteMark) &&
(LU2_SpecMem ^ SU1_SpecMem) && SU1_StV;
//Hold (LU2 needs to Hold);
// Note that Store Validity is taken into account in the
SUnOlder
// signals;
LU2_Hold =
SC_SU2Older && (AddrMatch2 || SMO) ||
SC_SU1Older && (AddrMatch1 || SU1_FirstAddr || SMO) ||
DTB_InhSptivLd && SC_LdOldest || SC_SU0Older ||
BusLocked && !Lock || LUViol;
```

Load hold logic 403 supplies the LU2_Hold signal to LU2 402 to inhibit execution of a stage 2 LdOp when any of the above-specified combinations of partial address matches (AddrMatch1 or AddrMatch2) and relative age indications (SC_SU2OLDER, SC_SU1OLDER, and SC_SU0OLDER) from scheduler 180 are present. Since no linear address has yet been computed for a StOp in stage 0, a younger LdOp in stage 2 is unconditionally held up for an older stage 0 StOp. As the older StOp advances to stages 1 and 2, a partial address mismatch may establish that no ordering constraints are violated by out-of-order completion of the younger LdOp and older StOp and load hold logic 403 will release the hold in accordance with the LU2_Hold equation.

In the exemplary embodiment described herein, a partial address match is performed based on a lower portion of the linear addresses for the potentially matching LdOp and StOp. The partial match is designed to select a large enough set of bits to limit the number of false matches, while balancing the speed and critical path impact of address match circuitry. In the exemplary embodiment, the partial linear address match is based on the lower bits of respective linear addresses (i.e., LinAddr(9,3), SU2_PageOffset(9,3), and SU1_LinAddr(9,3)) and balances an acceptable level of false matches with a desired match speed, although alternative embodiments may match larger or smaller numbers of address bits and may perform matches based on virtual, logical, linear, or physical addresses.

Eight-bit byte marks (ByteMark, SU1_ByteMark, and SU2_ByteMark) are also included in the partial address match. These byte marks are expanded variants of corresponding address bits 0, 1 and 2 which identify the particular bytes upon which a given LdOp or StOp operates, since in the exemplary embodiment (a processor implementation conforming to the x86 processor architecture), 1-byte, 2-byte, 4-byte, and 8-byte loads and stores are all supported. In the exemplary embodiment, these byte marks are compared to identify overlap, and therefore dependencies, between the particular bytes from which a LdOp reads and to which a StOp writes.

Several additional terms are included in the RTL describing load hold logic 403. For example, load hold logic 403 also inhibits the execution of non-speculative LdOps, i.e., those LdOps not allowed to read around a older memory transaction, as indicated by DTB_InhSptivLd. Non-speculative LdOps maintain strict ordering with respect to all older LdStOps, not just older StOps. For non-speculative loads, load hold logic 403 ensures that no older memory transactions are pending. Since scheduler 180 issues loads in order with respect to each other, that amounts to ensuring that there are no older StOps that have yet to be committed to data cache 170. Scheduler 180 tracks the status of StOps through store queue 159 to data cache 170 and supplies an SC_LdOldest signal indicating that no older uncommitted StOps exist.

Referring to FIG. 4, load hold logic 403 receives indications of the relative age of the LdOp in LU2 402 of load unit 152 from load ordering logic 434*a*. In particular, load hold logic 403 receives an SC_SU2OLDER indication, an SC_SU1OLDER indication, and an SC_SU0OLDER indication from respective scan logic (SU2 older scan logic 434*a*.1, SU1 older scan logic 434*a*.2, and SU0 older scan logic 434*a*.3) of load ordering logic 434*a*. Load hold logic 403 also receives partial address signals for the StOps in SU1 411 and SU2 412 stages of store unit 153 and for the LdOp in LU2 402 of load unit 152. Based on these inputs, load hold logic 403 selectively asserts a hold signal (LU2_Hold) stalling the LdOp in LU2 402 (and also subsequent LdOps) in accordance with the above RTL description.

LdOps (including Ops, operands, displacement values, and certain control signals) arrive at LU1 401 via respective busses and lines illustratively shown as collective bus 189. Memory locations addressed by LdOps in LU2 402 are accessed via data cache 170 when LU2_Hold is unasserted (or released) and supplied to execution units and scheduler 180 via a result bus 189.2 (not shown) of collective bus 189. Both stages of load unit 152 (LU1 401 and LU2 402) communicate with the data TLB 171 and with other memory management data structures residing at various levels in the memory hierarchy (L1 data cache 170, L2 cache 110, main memory, etc.) to resolve virtual (or linear) addresses to physical addresses.

Figure 5:
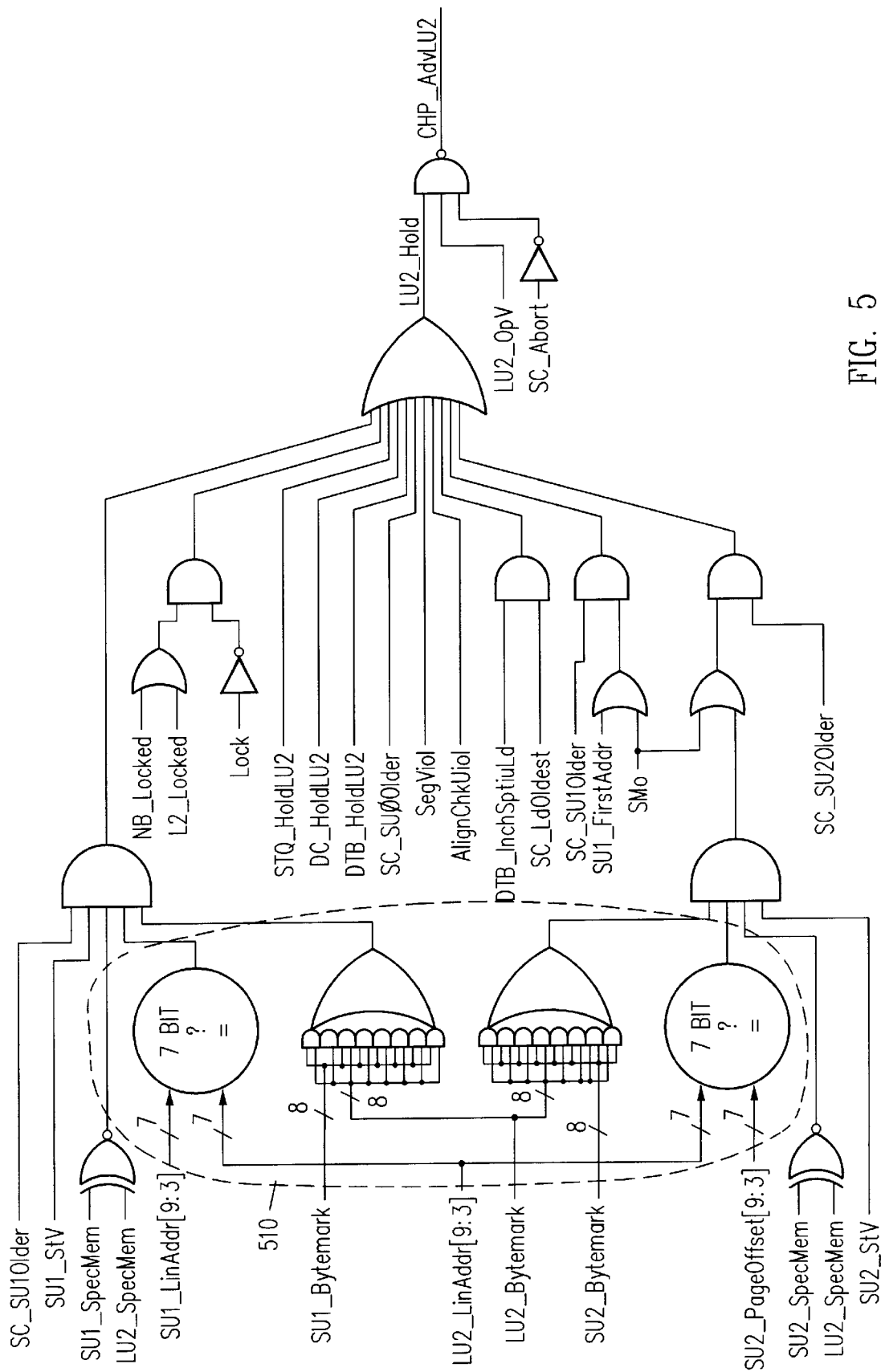
FIG. 5 is a circuit diagram of load hold logic in accordance with an embodiment of the present invention.

Those skilled in the art will recognize a variety of suitable implementations of load hold logic 403 conforming with the above-described RTL. Load hold logic 403 is any suitable implementation. FIG. 5 depicts one such suitable implementation in combinatorial logic.

Store Hold Logic

Store unit 153 includes analogous hold logic in the form of store hold logic 413 which checks for LdOps in various pipe stages that are older than the StOp in stage 2 (SU2 412) of store unit 153. Although the design of store hold logic 413 is analogous to load hold logic 403, the two are not symmetric. Store hold logic 413 checks for older LdOps in stage 1 (LU1 401) and stage 2 (LU2 402), i.e., stages 352 and 360 of FIG. 3. Two signals (SC_LU2OLDER and SC_LU1OLDER), which are supplied to store hold logic 413 by store ordering logic 434*b*, signal an older LdOp in stages 2 and 1, respectively. More precisely, SC_LU1OLDER indicates the presence of an older LdOp in stages of processing earlier than execution stage 2 (e.g., execution stage 1 352, operand fetch stage 0 340, or issue stage 330). Store hold logic 413 also receives a partial memory addresses for the StOp in stage 2 (SU2 412) of store unit 153 and selectively asserts a hold signal (SU2_Hold) to SU2 412 under conditions now described.

An older LdOp in stage 1 (or in an earlier stage) causes store hold logic 413 to unconditionally hold the current StOp in stage 2 of store unit 153. On the other hand, an older LdOp in stage 2 holds the current StOp only if there is also a match between the memory addresses for the StOp in stage 2 and older LdOp. The following RTL describes the design and operation of store hold logic 413:

```
//SU2 Hold Logic;
// ************;
// SU2 Partial Address Match with LU pipe Stage 2;
AddrMatch2 =
(LU2PageOffset(9,3) == LinAddr(9,3)) && (LU2_ByteMark &
ByteMark) &&
!(LU2_SpecMem ^ SU2_SpecMem);
// Hold (SU2 needs to Hold);
// Note that Load validity is taken into account in the
LUnOlder
// signals;
SU2_Hold =
StV &&
(SC_LU2Older && (AddrMatch2 || DTB_SUCacheDis || LU2_SMO) ||
SC_LU1Older) || SUViol;
```

Store hold logic 413 supplies the SU2_Hold signal to SU2 412 to inhibit execution of a stage 2 StOp when any of the above-specified combinations of partial address matches (AddrMatch2) and relative age indications (SC_LU2OLDER and SC_LU1OLDER) from scheduler 180 are present. A younger StOp in stage 2 is unconditionally held up for an older stage 1 (or earlier) LdOp. As the older LdOp advances to stage 2, a partial address mismatch may establish that no ordering constraints are violated by out-of-order completion of the younger StOp and older LdOp and store hold logic 413 will release the hold in accordance with the SU2_Hold equation.

As with load hold logic 403, store hold logic 413 performs partial address matching based on the lower portions (i.e., LinAddr (9,3) and LU2_PageOffset (9,3)) of linear addresses for StOp and LdOps. Byte marks (ByteMark and LU2_ByteMark) are also included in the partial address match.

In the exemplary embodiment, store hold logic 413, like load hold logic 403, is over-inclusive in the set of conditions which trigger a hold. However, the design of store hold logic 413 is even more over-inclusive than load hold logic 403. For example, store hold logic 413 holds a younger stage 2 StOp for an older stage 1 LdOp checking for an address match. Alternative embodiments may more precisely (or less precisely) delimit the set of conditions which trigger a hold in store hold logic 413 and/or store hold logic 413. In the exemplary embodiment however, store hold logic 413 less precisely delimits hold conditions based on an estimate that in a typical instruction profile, LdOps will more often be dependent on StOps than vice versa.

Referring to FIG. 4, store hold logic 413 receives indications of the relative age of the LdOp in SU2 412 of store unit 153 from store ordering logic 434*b*. In particular, store hold logic 413 receives an SC_LU2OLDER indication and an SC_LU1OLDER indication from respective scan logic (LU2 older scan logic 434*b*.1 and LU1 older scan logic 434*b*.2) of store ordering logic 434*b*. Store hold logic 413 also receives partial address signals for the LdOps in the LU2 402 stage of load unit 152 and for the StOp in SU2 412 of store unit 153. Based on these inputs, store hold logic 413 selectively asserts a hold signal (SU2_Hold) stalling the StOp in SU2 412 (and also subsequent StOps) in accordance with the above RTL description.

StOps (including Ops, operands, displacement values, and certain control signals) arrive at SU1 411 via respective busses and lines illustratively shown as collective bus 189. Memory addresses and store operands for StOps in SU2 412 are provided to store queue 159 when SU2_Hold is unasserted (or released). In turn, store queue 159 writes store operands to the address space via data cache 170. Both stages of store unit 153 (SU1 411 and SU2 412) communicate with the data TLB 171 and with other memory management data structures residing at various levels in the memory hierarchy (L1 data cache 170, L2 cache 110, main memory, etc.) to resolve virtual (or linear) addresses to physical addresses.

Figure 6:
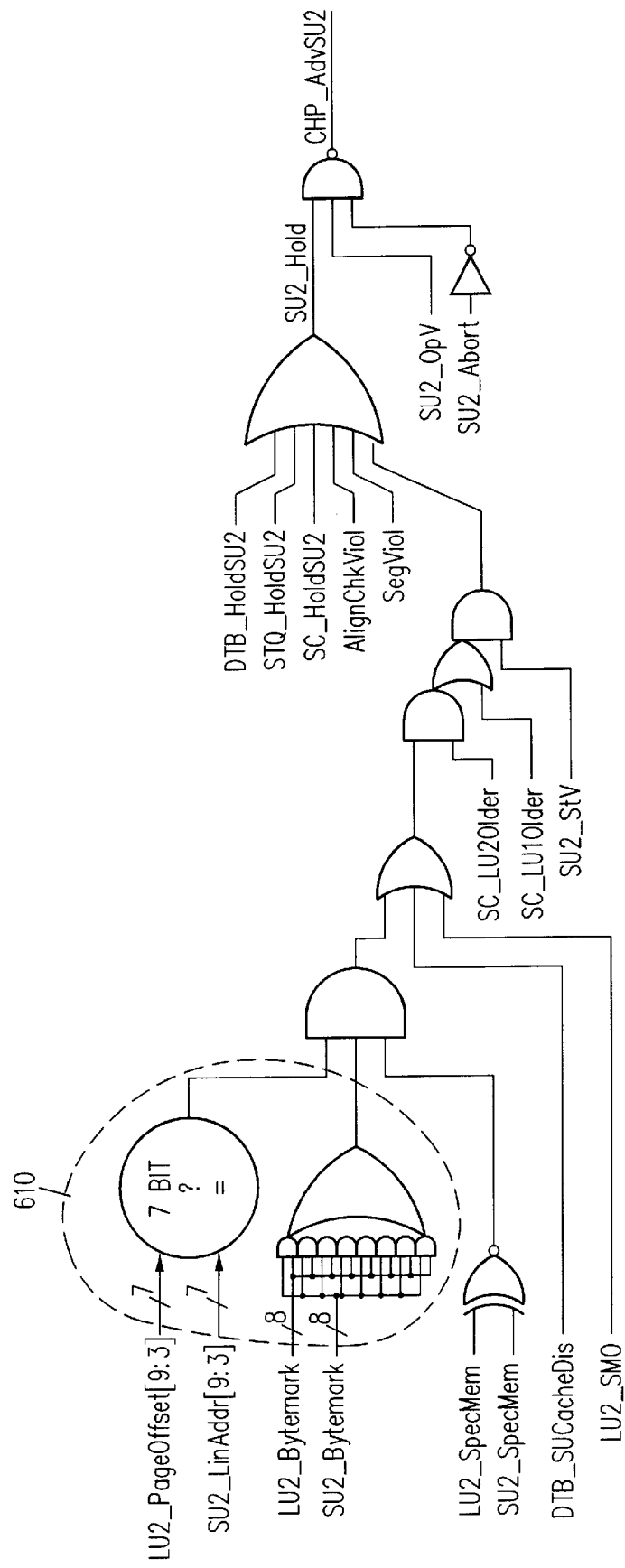
FIG. 6 is a circuit diagram of store hold logic in accordance with an embodiment of the present invention.

Those skilled in the art will recognize a variety of suitable implementations of store hold logic 413 conforming with the above-described RTL. Store hold logic 413 is any suitable implementation. FIG. 6 depicts one such suitable implementation in combinatorial logic.

Scheduler Logic including Scan Logic

Scheduler 180 also provides support for maintaining sufficient execution ordering between LdOps and StOps. In the exemplary embodiment, this support is in the form of scan logic instances which supply relative age indications to load hold logic 403 and store hold logic 413. As described above, ordering is maintained by holding operations at stage 2 of the load and store pipelines (i.e., at LU2 402 and SU2 412). Execution ordering is maintained for StOps which reference memory locations. In the exemplary embodiment, no ordering is enforced for LEA StOps (Load Effective Address) which do not actually address memory, although CDA and CIA StOps (Check Data Effective Address and Check Instruction Effective Address) which generate faultable addresses are included in the ordering scheme to simplify circuit design. No LdOps are excluded from the ordering scheme since all LdOps reference memory. Alternative embodiments may include or exclude Ops such as LEA, CDA, and CIA StOps as appropriate.

Referring back to FIG. 2, load-store ordering logic 234 in scheduler 180 provides indications of the relative age of LdStOps with respect to particular LdOps and StOps in stage 2 of respective load and store execution units. Load-store ordering logic 234 accesses Type[2:0] fields 241 and State[3:0] fields 242 of each Op entry (illustratively of Op entry 240.1) in scheduling reservoir 240 and provides relative store age indications (e.g., SC_SU2OLDER, SC_SU1OLDER, and SC_SU0OLDER) to load unit 152 and relative load age indications (e.g., SC_LU2OLDER and SC_LU1OLDER) to store unit 153 via lines collectively shown as 189.5.

Referring now to FIG. 4, load-store ordering logic 234 is shown as load ordering logic 434*a* and store ordering logic 434*b* portions. For LdOps, load ordering logic 434*a* determines the relative age of the LdOp in LU2 402 with respect to the StOp (if any) in SU2 412, with respect to the StOp (if any) in SU1 411, and with respect to any other StOps in earlier stages of processing. For StOps, store ordering logic 434*b* determines the relative age of the StOp in SU2 412 with respect to the LdOp (if any) in LU2 402 and with respect to any other Ldops in earlier stages of processing.

FIG. 4 depicts load ordering logic 434*a* including three component instances of scan logic, SU2 older scan logic 434*a*.1, SU1 older scan logic 434*a*.2, and SU0 older scan logic 434*a*.3. Each scan logic instance uses Type[2:0] fields 241 and State[3:0] fields 242 (not shown) of Op entries in scheduling reservoir 240 to supply respective relative age indications. SU2 older scan logic 434*a*.1 supplies SC_SU2OLDER; SU1 older scan logic 434*a*.2 supplies SC_SU1OLDER; and SU0 older scan logic 434*a*.3 supplies SC_SU0OLDER.

The design of store ordering logic 434*b* is analogous to, but not symmetric with, load ordering logic 434*a*. In particular, store ordering logic 434*b* includes two component instances of scan logic, LU2 older scan logic 434*b*.1 and LU1 older scan logic 434*b*.2. As with load ordering logic 434*a*, each scan logic instance of store ordering logic 434*b* uses Type[2:0] fields 241 and State[3:0] fields 242 to supply respective relative age indications. LU2 older scan logic 434*b*.1 supplies SC_LU2OLDER and LU1 older scan logic 434*b*.2 supplies SC_LU1OLDER. Although shown as independent scan logic for purposes of illustration, those skilled in the art will recognize that load ordering logic 434*a* and store ordering logic 434*b* may share logic, e.g., Type [2:0] and State[3:0] detection circuitry, across component instances of scan logic.

First Exemplary Scan Logic: In a first exemplary embodiment, the scan logic instances of load ordering logic 434*a* (i.e., SU2 older scan logic 434*a*.1, SU1 older scan logic 434*a*.2, and SU0 older scan logic 434*a*.3) include "propagate-kill" style scan chain logic which is a simplification over "generate-propagate-kill" carry-lookahead logic such as that used in high speed adders. In such an embodiment, scan logic of store ordering logic 434*b* (i.e., LU2 older scan logic 434*b*.1 and LU1 older scan logic 434*b*.2) also include "propagate-kill" style scan chain logic. Logic simplifications over traditional "generate-propagate-kill" carry lookahead techniques arise from the observation that generate (G) terms are zero and propagate (P) terms are the complement of associated kill (K) terms. These simplifications are described in greater detail in a co-pending U.S. Pat. No. 5,745,724 entitled "Selection Scan Chain for Rapidly Identifying an Object in a Sequential List", issued Apr. 28, 1998, naming Favor et al. as inventors, and in the corresponding continuation-in-part U.S. Pat. No. 5,881,261, issued Mar. 9, 1999, the detailed descriptions of which are hereby incorporated by reference.

Load ordering logic 434*a* and store ordering logic 434*b* are now described with reference to FIG. 4. During a first phase of stage 2 (for a LdStOp), scan chains of load ordering logic 434*a* and store ordering logic 434*b* perform "propagate-kill" style scans (three for LdOps, two for StOps) across the entries of scheduler 180 from oldest to youngest. During a second phase of stage 2, multiplexing logic samples the Cin signal corresponding to the stage 2 LdStOp and supplies a relative age indication to hold logic (403 or 413). Focusing illustratively on a single scan chain, SU2 older scan chain 434*a*.1 performs a "propagate-kill" scan across the entries of scheduler 180 during the first phase of stage 2. Multiplexing logic 434*a*.4 samples from its associated scan chain (SU2 older scan chain 434*a*.1) the Cin signal corresponding to the Op entry for a LdOp in LU2 402. Multiplexing logic 434*a*.4 then supplies the Cin as the SC_SU2Older signal to load hold logic 403.

The design and operation of remaining scan chains of load ordering logic 434*a* are similar. For example, SU1 older scan chain 434*a*.2 scans the entries of scheduler 180 and associated multiplexing logic 434*a*.5 supplies the SC_SU0Older signal to load hold logic 403. Similarly, SU0 older scan chain 434*a*.3 scans the entries of scheduler 180 and associated multiplexing logic 434*a*.6 supplies the SC_SU0Older signal to load hold logic 403.

The scan chains of store ordering logic 434b are analogous. Focusing illustratively on a single scan chain, LU2 older scan chain 434b.1 performs a "propagate-kill" scan across the entries of scheduler 180 during the first phase of stage 2. Multiplexing logic 434b.4 samples from its associated scan chain (LU2 older scan chain 434b.1) the Cin signal corresponding to the Op entry for a StOp in SU2 412. Multiplexing logic 434b.4 then supplies the Cin as the SC_LU2Older signal to store hold logic 413. The design and operation of remaining scan chains of store ordering logic 434b are similar. For example, LU1 older scan chain 434b.2 scans the entries of scheduler 180 and associated multiplexing logic 434b.5 supplies the SC_LU1Older signal to store hold logic 413.

A stage 2 LdOp (or stage 1 LdOp performing the first half of a misaligned load) requires three scan chains since the LdOp's age relative to three categories of StOps must be determined. Each scan chain of load ordering logic 434a scans for the first/oldest StOp in one of the three categories. The SU2 older scan chain 434a.1 detects a stage 2 StOp (or stage 1 StOp performing the first half of a misaligned store). The SU1 older scan chain 434a.2 detects a stage 1 StOp, and SU0 older scan chain 434a.3 detects a pre-stage 1 StOps. The state of the "carry" signal, Cin, at any point in the scan chain reflects whether a StOp of relevant state (as encoded by State[3:0] of the corresponding Op entry in scheduler 180) has been encountered/found. Thus, the Cin corresponding to an Op entry for a stage 2 LdOp provides the LdOp's age relative to StOps of the state detected by the particular scan chain. If Cin=1, the carry signal was not "killed" as it "propagated" up the scan chain from older to younger Op entries and no older StOp of the particular state exists. Based on these Cin indications, relative age indications (SC_SU2Older, SC_SU1Older, and SC_SU0Older) are supplied to load hold logic 403 which then determines which SU address comparator signals (AddrMatch1 or AddrMatch2) to examine and, more generally, whether to hold up the stage 2 LdOp.

A stage 2 StOp (or stage 1 StOp performing the first half of a misaligned store) requires two scan chains since the StOp's age relative to two categories of LdOps must be determined. Each scan chain of store ordering logic 434b scans for the first/oldest LdOp in one of the two categories. The LU2 older scan chain 434b.1 detects any stage 2 LdOp (or stage 1 LdOp performing the first half of a misaligned load). The LU1 older scan chain 434b.2 detects any pre-stage 2 LdOps. The state of the "carry" signal, Cin, at any point in the scan chain reflects whether a LdOp of relevant state (as encoded by State[3:0] of the corresponding Op entry in scheduler 180) has been encountered/found. The Cin corresponding to an Op entry for a stage 2 StOp provides the StOp's age relative to LdOps of the state detected by the particular scan chain. If Cin=1, the carry signal was not "killed" as it propagated up the scan chain from older to younger Op entries and no older LdOp of the particular state exists. Based on these Cin indications, relative age indications (SC_LU2Older and SC_LU1Older) are supplied to store hold logic 413, which determines whether to examine the LU stage 2 address comparator (AddrMatch2) and whether to hold up the stage 2 StOp.

Each scan chain (i.e., SU2 older scan chain 434a.1, SU1 older scan chain 434a.2, SU0 older scan chain 434a.3, LU2 older scan chain 434b.1, and LU1 older scan chain 434b.2) is a "propagate-kill" chain from the oldest to youngest entry of scheduler 180. The following RTL describes each of the five scan chains in terms of lookahead equations. The bit-level P/K terms are based only on the State[3:0] field (in particular, the S1, S2, and S3 bits) and Type[2:0] field (ST or LU) of an entry. For the three LdOp scan chains, the ST type bit is used instead of the su bit. This distinguishes the StOps which actually reference memory from LEA operations which only generate logical addresses.

The RTL which follows, describes the operation of load ordering logic 434a and store ordering logic 434b, including multiplexing logic (434a.4, 434a.5, 434a.6, 434b.4, and 434b.5) and scan chains (434a.1, 434a.2, 434a.3, 434b.1, and 434b.2). In particular, Op entry equations labeled LUst2, LUst1, and LUst0 denote the P and K terms corresponding to each Op entry for the scan chains respectively enumerated above as SU2 older scan chain 434a.1, SU1 older scan chain 434a.2, and SU0 older scan chain 434a.3. Similarly, Op entry equations labeled SUld2 and SUld1 denote the P and K terms corresponding to each Op entry for the scan chains respectively enumerated above as LU2 older scan chain 434b.1 and LU1 older scan chain 434b.2.

Bit-level or Op Entry equations

| | |
|---|---|
| LUst2: | ~P = K = ST ~S3 (S2 + S1 SU2_FirstAddrV) |
| LUst1: | ~P = K = ST ~S2 |
| LUst0: | ~P = K = ST ~S1 |
| SU1d2: | ~P = K = LU ~S3 (S2 + S1 LU2_FirstAddrV) |
| SU1d1: | ~P = K = LU ~S2 |

In the exemplary embodiment, (S2+S1 SU2_FirstAddrV) and (S2+S1 LU2_FirstAddrV) terms extend the Op entry equations to handle stalling of stage 1 LdStOps performing the first half of a misaligned memory access).

The scan chains of load ordering logic 434a and store ordering logic 434b are organized as carry-lookahead logic which are described by the following bit and group lookahead equations:

Group lookahead equations (based on four-bit groups)

```
Pgrp = P0 P1 P2 P3
CIn0 = Cin          // note: Op 0 is oldest Op within a
quad
CIn1 = Cin P0
CIn2 = Cin P0 P1
CIn3 = Cin P0 P1 P2
```

Lookahead among Quads

```
CinGrp5 = 1         // note: Quad 5 is oldest quad
CinGrp4 = Pgrp5
CinGrp3 = Pgrp5 Pgrp4
CinGrp2 = Pgrp5 Pgrp4 Pgrp3
CinGrp1 = Pgrp5 Pgrp4 Pgrp3 Pgrp2
CinGrp0 = Pgrp5 Pgrp4 Pgrp3 Pgrp2 Pgrp1
``` wherein groups are four-bit groups. Those skilled in the art will recognize a variety of suitable implementations of scan chains including implementations using different group configurations.

Figure 13:
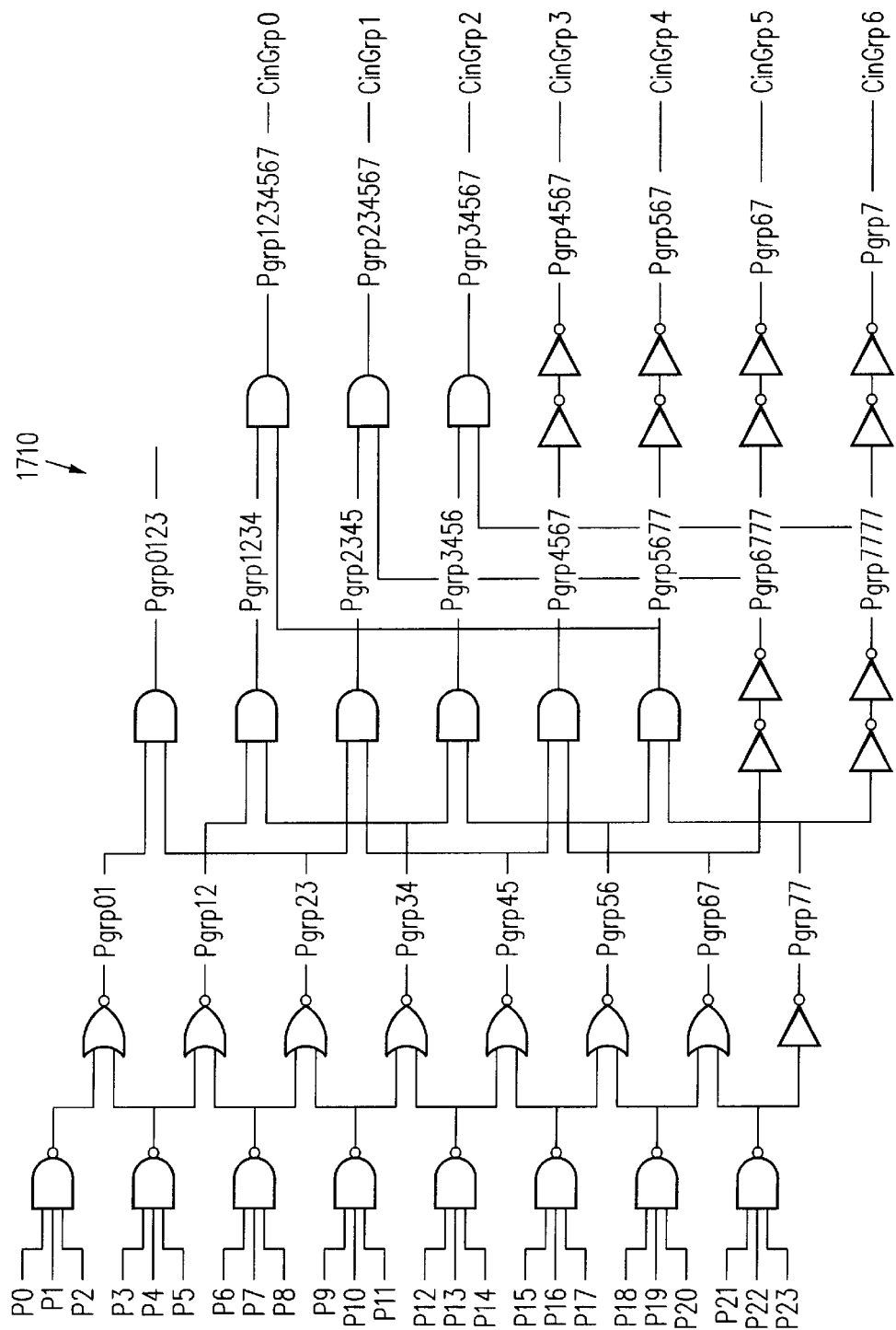
FIGS. 13 and 14 are a circuit diagram of a lookahead scan chain for load-store ordering logic in accordance with an embodiment of the present invention.
Figure 14:
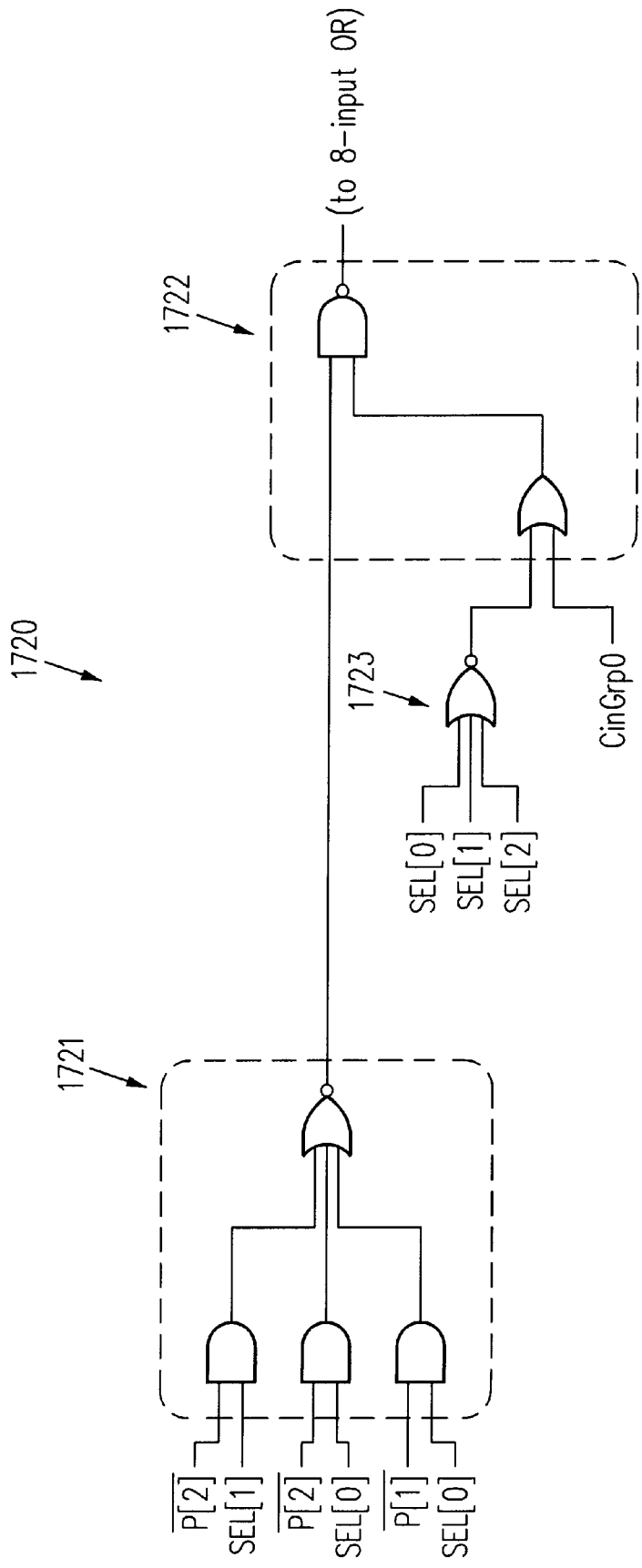

Relative age determinations can be accelerated by using tree structured lookahead logic. FIGS. 13 and 14 depict one such design based on 3-bit groups. FIG. 13 depicts an AND-tree 1710 for generating seven of the eight group "carry in" signals, CinGrp0, CinGrp1, CinGrp2, CinGrp3, CinGrp4, CinGrp5, and CinGrp6, from the P (propagate) terms associated with each of the 24 Op entries of scheduler 180. The eighth "carry in" signal, CinGrp7, is a logical 1. In the embodiment of FIG. 13, the first two levels of gates are shown as NAND and NOR gates, whereas subsequent levels are AND gates. Alternate embodiments may implement the canonical AND tree using AND gates, alternating levels of NAND and NOR gates, or combinations thereof Signal rise times can be improved (along the generally longer lines connecting the later levels of gates) by implementing the later levels of the canonical AND tree as NAND-inverter pairs. Preferably, additional gate delays (e.g., the back-to-back inverters shown in FIG. 13) are provided along signal paths, such as the CinGrp3, CinGrp4, CinGrp5, and Cin-Grp6 signal paths. In this way, fanout in the AND-tree can be limited to two (2), thereby improving the critical path timing characteristics of the AND-tree as compared with implementations having larger fanouts at certain gates. Implementations of scan chains 4.34a.1, 434a.2, 434a.3, 434b.1, and 434b.2 based on the logic of FIGS. 13 and 14 are analogous, though the nature of the P terms associated with each (e.g., P0, P1, P2, . . . P23) differs as described above with respect to the Op entry equations.

Returning now to the more generalized, RTL description of the scan chains of load ordering logic 434a (i.e., the scan chains defined above by the LUst2, LUst1, and LUst0 equations), the Cin values corresponding to each Op entry (e.g., the twenty-four LUst2chain. CIN values of the scan chain having entries defined above by the LUst2 equation, the twenty-four LUst1chain. CIN values of the scan chain having entries defined above by the Lust1 equation, and the twenty-four LUst0chain. CIN values of the scan chain having entries defined above by the Lust0 equation) are combined in accordance with the following RTL.

```
LUAges[2:0] = 3'b0
SUAges[1:0] = 2'b0
for (all Ops) {
LUAges[2:0] |=
(LU ~S3 (S2 + S1 LU2_FirstAddrv)) ?
{~LUst2chain.CIN, ~LUst1chain.CIN1, ~LUst0chain.CIN
}
:3'b0
SUAges[1:0] |=
(SU ~S3 (S2 + S1 SU2_FirstAddrv)) ?
{~SU1d2chain.CIN1, ~SU1d1chain.CIN} : 2'b0
}
```

Focusing on the load ordering logic 434a definition, the three signals, LUAges[2:0], are outputs of multiplexing logic 434a.4, multiplexing logic 434a.5, and multiplexing logic 434a.6, receptively. The (LU ~S3 (S2+S1 LU2_FirstAddrV) term represents multiplexer selection logic selecting the particular Cin value corresponding to a stage 2 LdOp (or stage 1 LdOp performing the first half of a misaligned load).

Store ordering logic 434b is similar. For each of the two scan chains of store ordering logic 434b, the Cin values corresponding to each, Op entry (i.e., the twenty-four SUld2chain. CIN values of the scan chain having entries defined above by the SUld2 equation and the twenty-four SUld1chain. CIN values of the scan chain having entries defined above by the SUld1 equation) are combined with 24:1 multiplexing logic defined also by the above RTL. Signals SuAges[1:0], are outputs of multiplexing logic 434b.4 and multiplexing logic 434b.5, receptively. The (SU ~S3 (S2+S1 SU2_FirstAddrV) term represents multiplexer selection logic selecting the particular Cin value corresponding to a stage 2 StOp (or stage 1 StOp performing the first half of a misaligned store).

The carry signals selected by multiplexing logic 434a.4, 434a.5, and 434a.6 are inverted and are respectively supplied to load hold logic 403 as SC_SU2Older, SC_SU1Older, and SC_SU0Older. Similarly, carry signals selected by multiplexing logic 434b.4 and 434b.5 are inverted and are respectively supplied to store hold logic 413 as SC_LU2Older and SC_SU1Older. Those skilled in the are will recognize a variety of suitable implementations for multiplexing logic.

FIG. 14 depicts a design for multiplexing logic 434a.4, 434a.5, 434a.6, 434b.4 and 434b.5 which provides accelerated generation of the respective LUAges[2:0] and LuAges [2:0] signals using group carry-in signals (CinGrp0, CinGrp1, CinGrp2, CinGrp3, CinGrp4, CinGrp5, CinGrp6, and CinGrp7) from the AND tree of FIG. 13. For implementations of each scan chain (i.e., SC_SU2Older, SC_SU1Older, SC_SU0Older, SC_LU2Older and SC_SU1Older), signals associated with groups of three Op entries are combined in eight parallel logic blocks, illustratively logic block 1720, and the eight resulting signals are combined in a two level OR structure (not shown) to provide the associated Ages signal. Each of the eight logic blocks can be implemented using three gates (i.e., NOR gate 1723 and the pair of complex gates 1721 and 1722). Significantly, only a single gate delay (i.e., that associated with complex gate 1722) is included in the critical path for providing the associated Ages signal. In logic block 1720, the CinGrp0 input is the group 0 carry-in signal from FIG. 13, the P[0], P[1], and P[2] inputs represent the Op entry level propagate terms associated with a given group of three, and the SEL[0], SEL[1], and SEL[2] terms are the associated Op entry selection terms. The seven remaining parallel logic blocks (not shown) are similar, receiving respective ones of the group carry-in signals, Op entry level propagate terms, and Op entry selection terms as inputs.

Implementations of multiplexing logic 434a.5, 434a.6, 434b.4 and 434b.5 based on the logic of FIG. 14 are analogous, though the nature of the P[N] terms associated with each differs as described above with respect to the Op entry RTL equations. Additionally, the nature of the SEL[N] terms differs depending on whether the scan chain is for identifying StOps older than a stage 2 LdOp or for identifying LdOps older than a stage 2 StOp. The SEL[N] inputs to the complex gates are provided by logic implementing the selection terms described above with reference to the above RTL, i.e., (LU ~S3 (S2+S1 LU2_FirstAddrV) for the LUx-Older scan chains and (SU ~S3 (S2+S1 SU2_FirstAddrV) for the SUxOlder scan chains.

Second Exemplary Scan Logic: In a second exemplary embodiment, load ordering logic 434a and store ordering logic 434b include scan logic of hierarchical (rather than lookahead) design, which is now described with reference to FIGS. 4–10. During a first phase of stage 2 for a LdStOp, scan logic of load ordering logic 434a and/or store ordering logic 434b scan the age ordered Op entries 240 of scheduler 180 for older LdStOps of the opposing type, i.e., load ordering logic 434a scans for older StOps and store ordering logic 434b scans for older LdOps. In an exemplary embodiment, each of three instances of scan logic of load ordering logic 434a and each of two instances of scan logic of store ordering logic 434b include hierarchically-organized scan logic for scanning both within groups of the age ordered Op entries 240 and across groups. FIGS. 5–10 depict scan logic for an exemplary scheduler embodiment having twenty-four (24) Op entries arranged in eight (8) groups of three (3) Op entries each. Persons of ordinary skill in the art will appreciate, based on the following description, suitable variations for differing numbers of Op entries and group arrangements.

Figure 7:
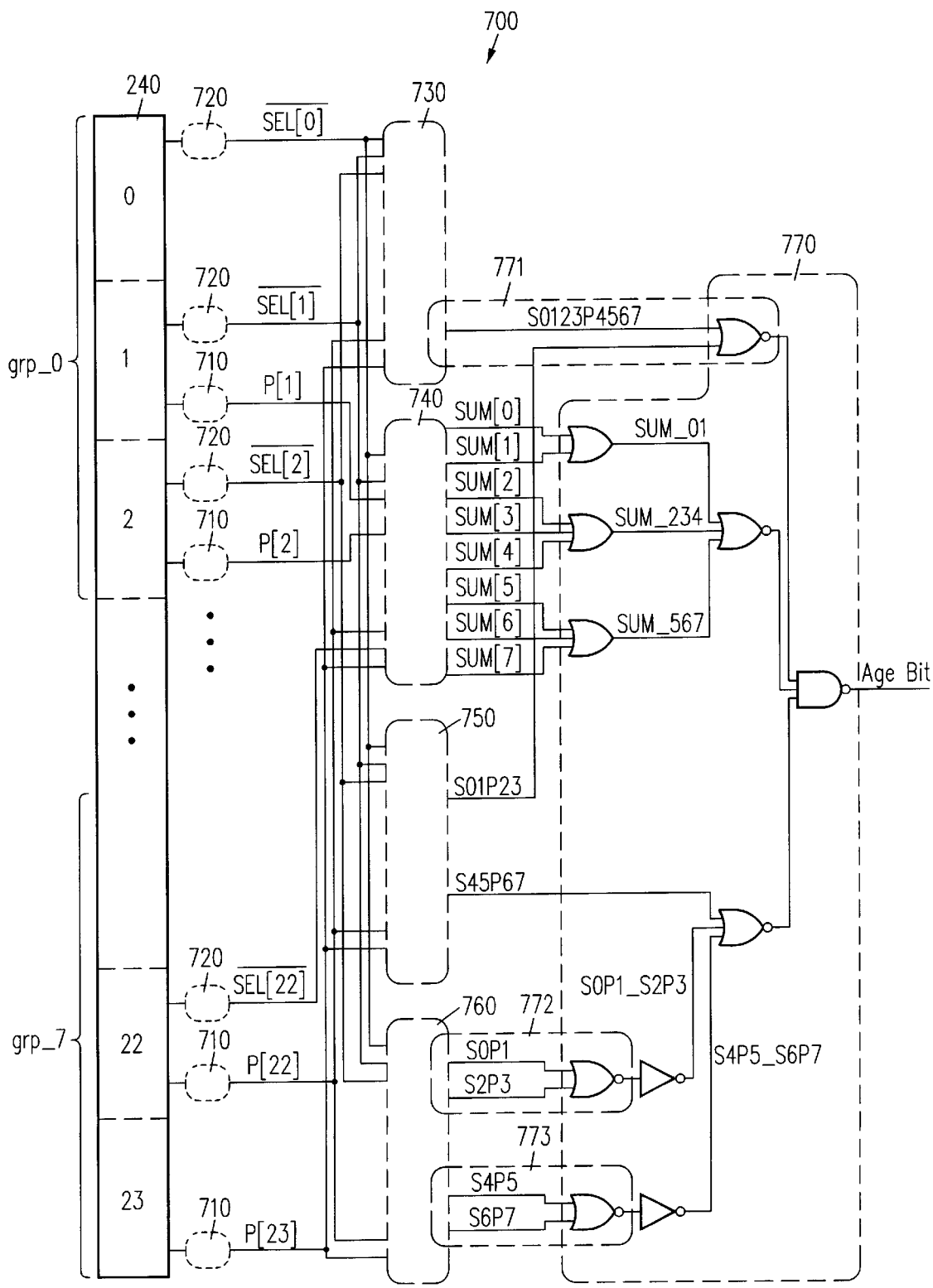
FIG. 7 is a block diagram depicting hierarchical scan logic in accordance with an embodiment of the present invention.

The generic structure of exemplary scan logic for a 24 Op entry/8 group embodiment of scheduler 180 is now described with reference to FIG. 7. Instances of presence indication logic 710 detect combinations of Type[2:0] and State[3:0] field values associated with the particular scan logic implemented (i.e., SU2 olderscan logic 434*a*.1, SU1 older scan logic 434*a*.2, SU0 older scan logic 434*a*.3, LU2 older scan logic 434*b*.1, or LU1 older scan logic 434*b*.2). For example, presence indication logic 710 for SU1 older scan logic 434*a*.2 implemented in accordance with FIG. 7 detects whether the corresponding Op entry includes a stage 1 StOp. Each of the 23 instances of presence indication logic 710 supply corresponding Presence indications (e.g., P[1], P[2], . . . P[23]) appropriate to a particular instance of scan logic for use by within-group logic 740 and/or across-group logic (i.e., first-level across-group logic 760, second-level across-group logic 750, and/or third-level across-group logic 730). In the embodiment of FIG. 7, P[0] is unused.

Corresponding instances of selection indication logic 720 also detect combinations of Type[2:0] and State[3:0] field values; however, in the case of selection indication logic 720 instances, the combinations Type[2:0] and State[3:0] field values detected are indicative of a stage 2 LdOp (i.e., of a LdOp in LU2 402) for scan logic instances of load ordering logic 434*a*, and of a stage 2 StOp (i.e., of a StOp in SU2 412) for scan logic instances of store ordering logic 434*b*. Each of the 23 instances of selection indication logic 720 supply corresponding SELection indications (e.g., $\overline{\text{SEL}[0]}$, $\overline{\text{SEL}[1]}$, . . . $\overline{\text{SEL}[22]}$) appropriate to the load or store ordering role of a particular of scan logic instance for use by within-group logic 740 and/or across-group logic (i.e., first-level across-group logic 760, second-level across-group logic 750, and/or third-level across-group logic 730). In the embodiment of FIG. 7, $\overline{\text{SEL}[23]}$ is unused.

Within-group logic 740 provides indications, each indicative of the presence within a respective group of Ops, of an Op which matches the Type[2:0] and State[3:0] combination detected by presence indication logic 710 of the particular scan logic and which is older than a selected Op entry within the same group. Selection indications (e.g., $\overline{\text{SEL}[0]}$, $\overline{\text{SEL}[1]}$, . . . $\overline{\text{SEL}[22]}$) respectively associated with Op entries of scheduling reservoir 240 are indicative of the selected Op entry from which scanning for an older Op entry is based. In embodiments described herein for implementing scan logic of load ordering logic 434*a* and store ordering logic 434*b*, a single Op entry selection indication is provided to each instance of scan logic implemented in accordance with FIG. 7. The single Op entry selection indication so provided corresponds to a LdStOp, if any, in stage 2 of load unit 152 or store unit 153, i.e., corresponding to a stage 2 LdOp for SC_SUxOLDER scan logic and corresponding to a stage 2 StOp for SC_LUxOLDER scan logic. Alternative embodiments may select different types of Ops at different stages of execution with suitable modifications to Op entry selection indication logic and, in addition, may supply multiple selection indications for relative age (or other priority) comparisons to the multiple Op entries indicated thereby.

Figure 8:
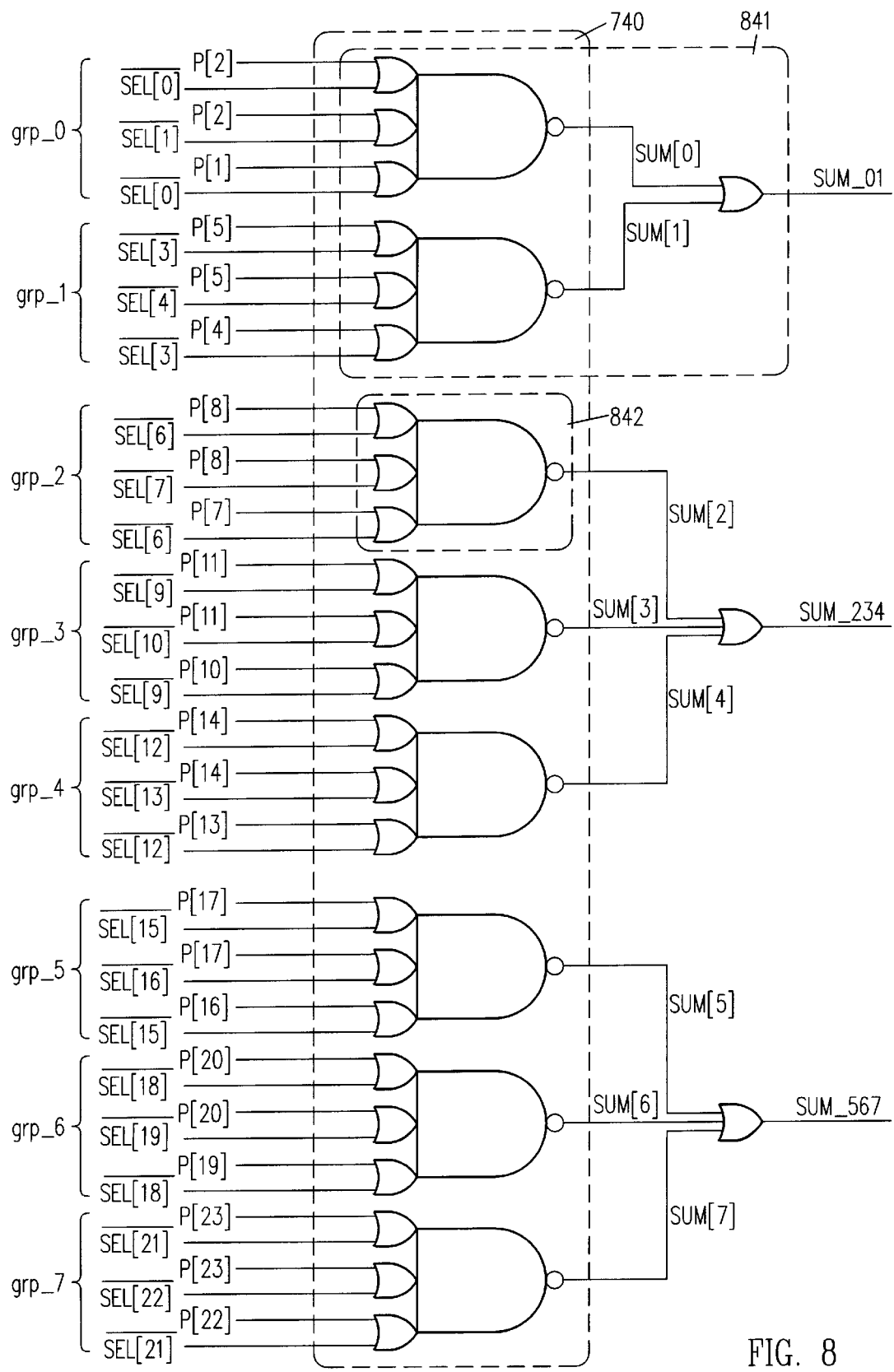
FIG. 8 is a logic diagram depicting within-group logic for hierarchical scan logic in accordance with an exemplary embodiment of the present invention.

In the exemplary embodiment of FIG. 8, within-group logic 740 includes logic for each group (illustratively, within-grp_2 logic 842) implemented by a 6-input OR-NAND complex gate. Of course, persons of ordinary skill in the art will appreciate a wide variety of other suitable logic configurations for supplying indications indicative of the selected Op entry and an older operation detection both within a particular Op entry group. Within group indications for each group (i.e., SUM[0], SUM[1], . . . SUM[7]) are partially combined in combining logic 770, several gates of which are depicted in FIG. 8.

Figure 9:
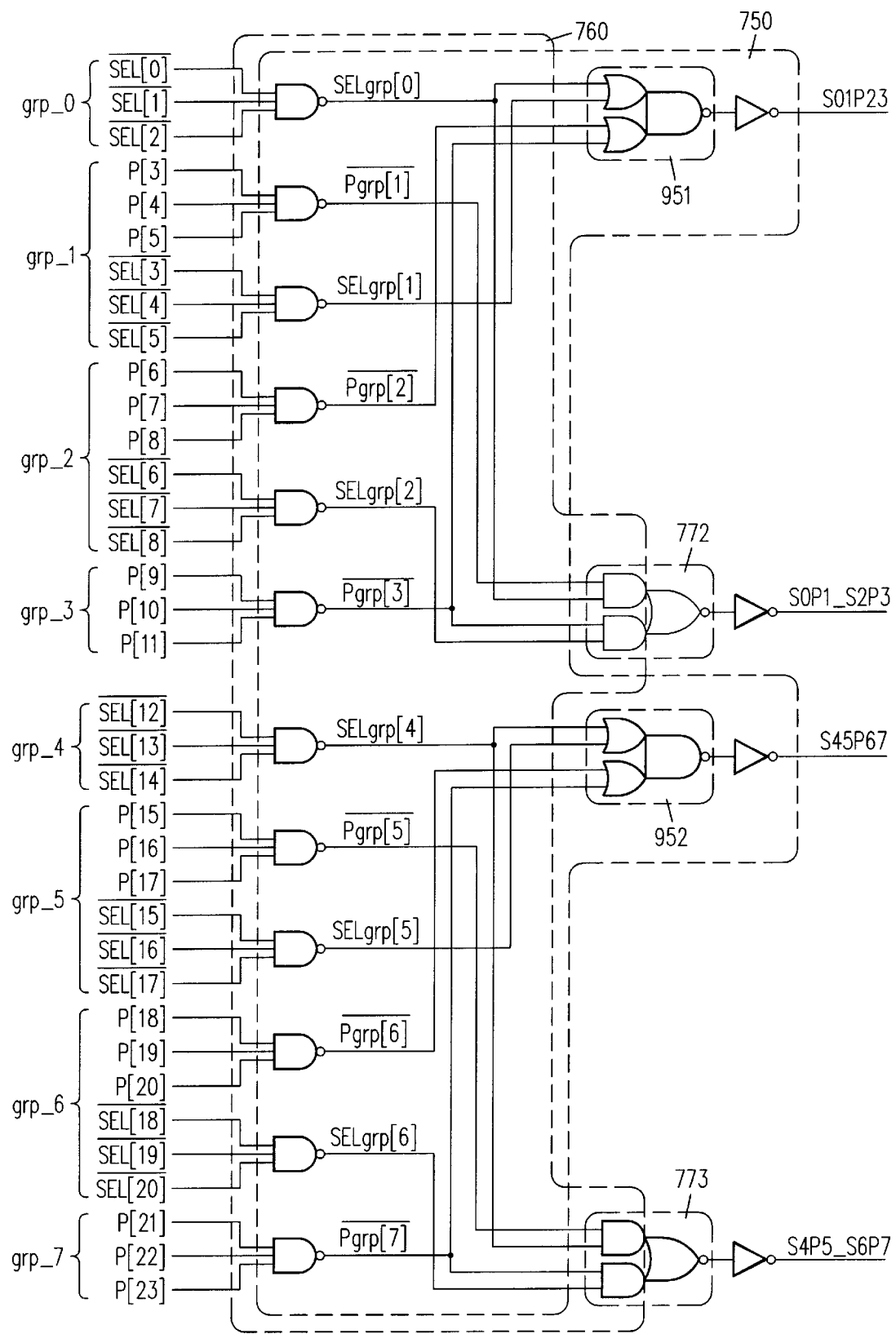
FIG. 9 is a logic diagram depicting first and second-level across-group logic for hierarchical scan logic in accordance with an embodiment of the present invention.

FIG. 9 depicts first-level across-group logic 760 and second-level across-group logic 760 sharing overlapping logic portions. First-level across group logic 760 supplies indications (S0P1_S2P3 and S4P5_S6P7) indicative of the selected Op entry in a first group of Op entries and an older operation detection in an adjacent group of 30 older Op entries, e.g., indicative of the selected Op entry in grp_0 and an older Op detection in grp_1, of the selected Op entry in grp_2 and an older Op detection in grp_3, etc. In the exemplary embodiment of FIG. 9, first-level across-group logic 760 is implemented by first stages of NAND-gates and second stages of AND-gate functionality. AND-gate functionality is provided by a portion of 4-input complex AND-NOR gates 772 and 773, the NOR functionality of which is associated with combining logic 770. Of course, persons of ordinary skill in the art will appreciate a wide variety of other suitable logic configurations for supplying indications indicative of the selected Op entry in a first group of Op entries and an older operation detection in a second group of Op entries. First-level across-group indications for each pair of adjacent groups are partially combined in combining logic 770, several gates of which are depicted in FIG. 9.

Second-level across group logic 750 supplies indications (S01P23 and S45P67) indicative of the selected Op entry in either of two adjacent groups of Op entries and an older operation detection in either of two adjacent groups of older Op entries, e.g., indicative of the selected Op entry in either grp_0 or grp_1 and an older Op detection in grp_2 or grp_3, of the selected Op entry in either grp_4 or grp_5 and an older Op detection in grp_6 or grp_7, etc. In the exemplary embodiment of FIG. 9, second-level across-group logic 750 is implemented by first stages of NAND-gates, second stages of 4-input complex OR-NAND gates (951 and 952), and third stages of inverters. Of course, persons of ordinary skill in the art will appreciate a wide variety of other suitable logic configurations for supplying indications indicative of the selected Op entry in a either of two groups of Op entries and an older operation detection in at least one of two other groups of older Op entries.

Figure 10:
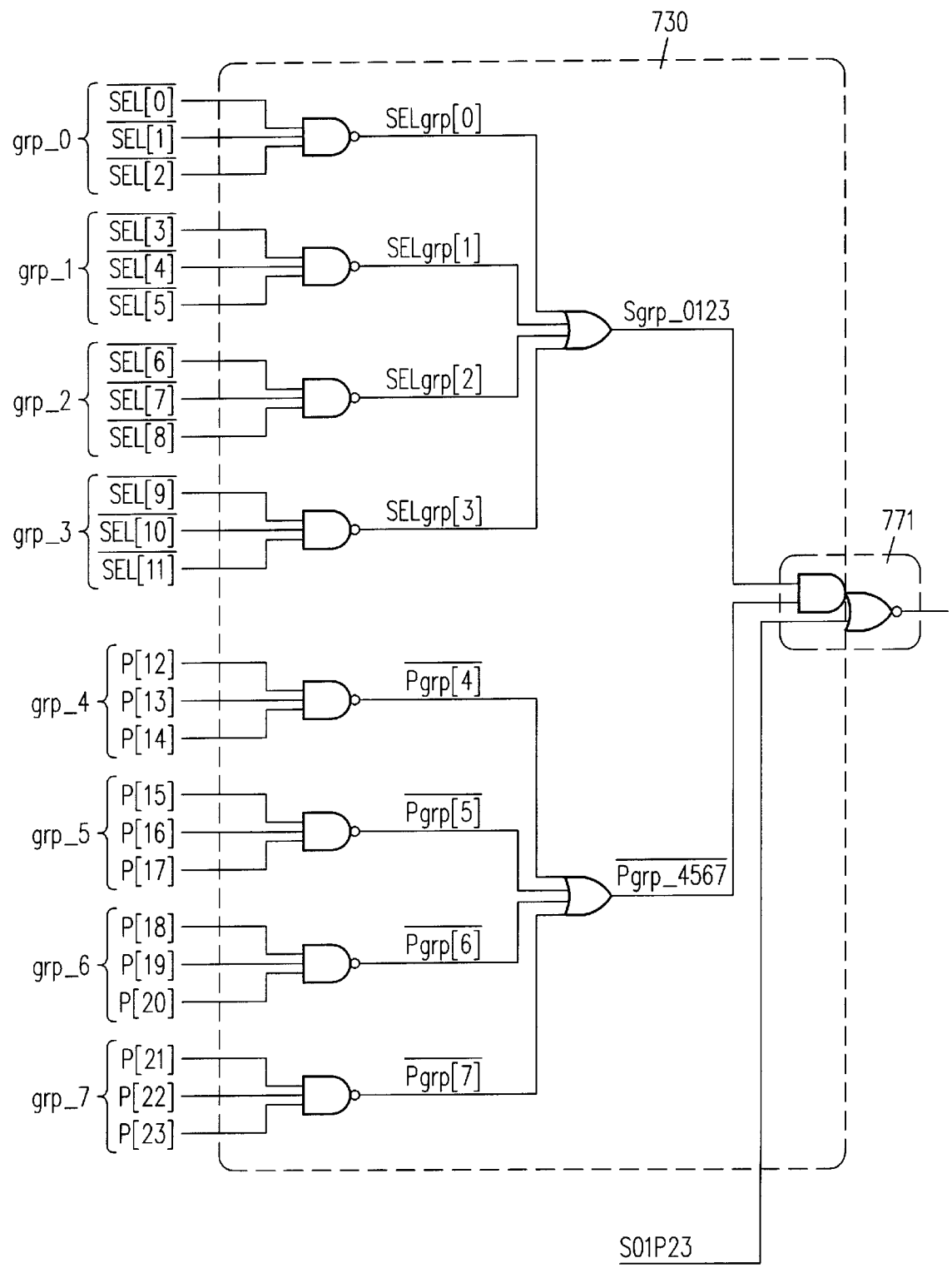
FIG. 10 is logic diagram depicting third-level across-group logic for hierarchical scan logic in accordance with an embodiment of the present invention.
Figure 11:
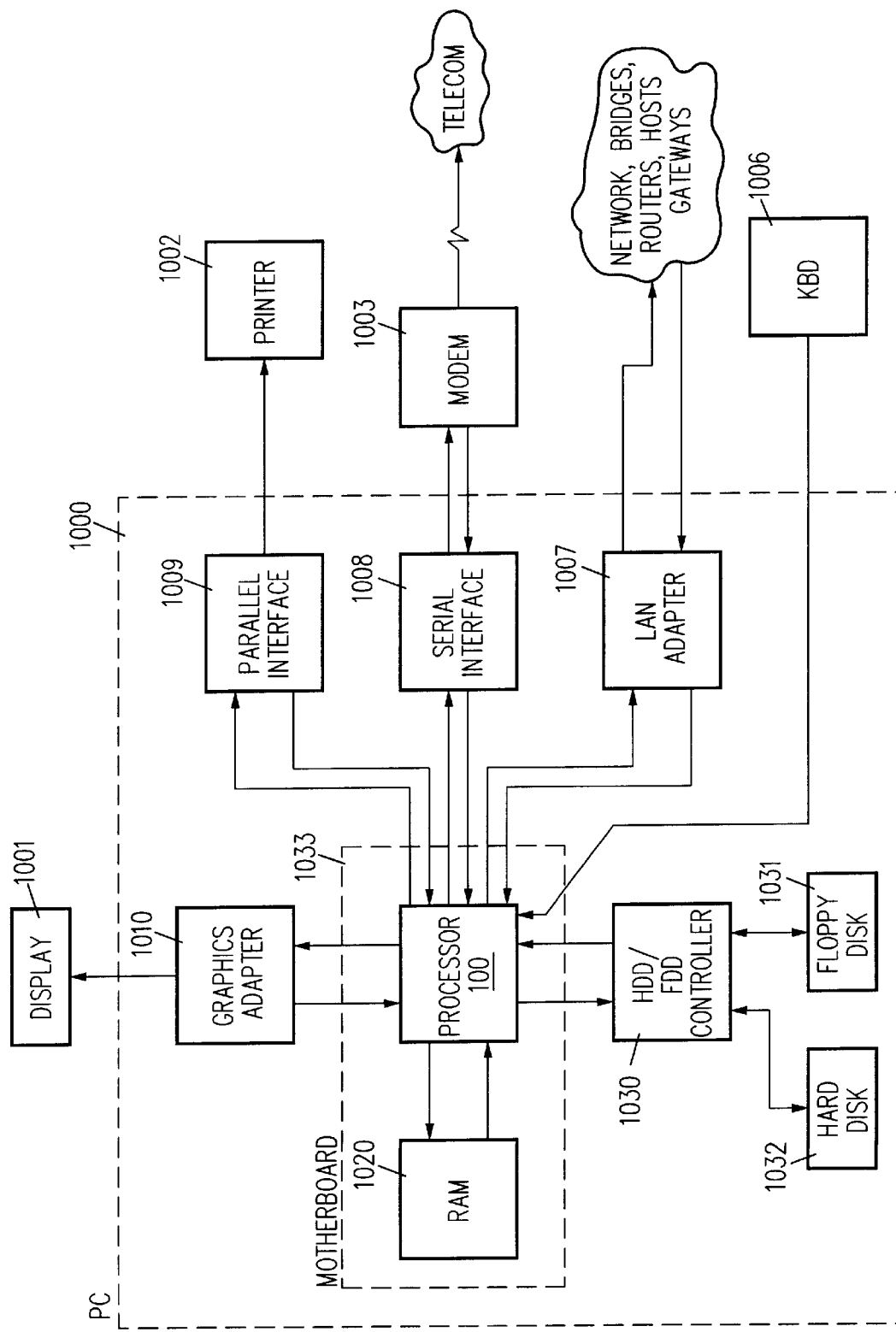
FIG. 11 is a block diagram of a computer system incorporating a processor that provides out-of-order load/store execution control in accordance with an embodiment of the present invention.

FIG. 10 depicts third-level across-group logic 730 which supplies intermediate indications (Sgrp_0123 and Pgrp_4567) respectively indicative of the selected Op entry being in one of the first four groups of Op entries and of an older operation detection in any of the four groups of older Op entries, i.e., indicative of the selected Op entry in grp_0, grp_1, grp_2, or grp_3 and of an older Op detection in grp_4, grp_5, grp_6, or grp_7. In the exemplary embodiment of FIGS. 7 and 10, Sgrp_0123 and Pgrp_4567 intermediate indications are provided by first stages of NAND-gates and second stages of OR-gates, and a conjunction of the Sgrp_0123 and Pgrp_4567 intermediate indications is provided by the AND-functionality of 3-input complex AND-NOR gate 771. In this way, portions of third-level across-group functionality and of combining logic functionality are provided by complex AND-NOR gate 771. Of course, persons of ordinary skill in the art will appreciate a wide variety of other suitable logic configurations for supplying indications indicative of the selected Op entry in any of four groups of Op entries and an older operation detection in at least one of four other groups of older Op entries.

Referring back to FIG. 7, combining logic 770 combines indications from within-group logic 740 and across-group logic (i.e., from first-level across-group logic 760, second-level across-group logic 750, and third-level across-group logic 730) to provide a relative age indication for the particular scan logic implemented. Taken together the OR-gate, NOR-gate, and NAND-gate stages of combining logic 770 provide the DeMorgan equivalent of an OR-tree. Of course, persons of ordinary skill in the art will appreciate a wide variety of other suitable logic configurations for combining within- and across-group indications to provide a composite relative age indication. Advantageously, the logic design of combining logic 770, when considered in conjunction with within-group logic 740, first-level across-group logic 760, second-level across-group logic 750, and third-level across-group logic 730 imposes no more than 5 inverting gate delays along any path.

Larger and smaller numbers of Op entries may be accommodated with similarly advantageous numbers of gate delays. For example, persons of ordinary skill in the art will recognize that Op entry counts of 2x, 4x, etc. can be supported with analogous within-group, across-group, and combining logic imposing an additional inverting gate delay for each order of binary magnitude of increase in Op entry count. Smaller numbers of Op entries may be similarly accommodated with analogous reductions in inverting gate delays. More generally, one family of scan logic implementations, in accordance with the present invention, for larger and smaller numbers of Op entries (e.g., 3, 6, 12, 48, 96, . . . ) scanned as 3-member groups imposes $$\log_2\left(\frac{N}{3}\right) + 2$$

inverting gate delay where N is the number of Op entries. Embodiments in accordance with such a family of scan logic implementations include $$\log_2\left(\frac{N}{3}\right)$$

successive levels of hierarchically-organized across-group logic.

Three member groups are advantageous in the exemplary 24 Op entry embodiment described herein because of the whole number multiples of three which map to the 24 Op entries and because of the suite of logic cell libraries available. Nonetheless, larger or smaller groups are also suitable at each level of the across-group hierarchy; suitable selections of gates and complex gates will be apparent to persons of ordinary skill in the art. In addition, although groups are depicted as of uniform size and across-group logic is depicted with Op entry coverage doubling at each successive level of the across-group hierarchy, alternative embodiments having non-uniform group sizes and with differing Op entry coverage growth at successive levels of the across-group hierarchy are also suitable. Suitable modifications to scan logic structures will be appreciated by persons of ordinary skill in the art.

As will be apparent to persons of ordinary skill in the art, the boundaries between the within- and across-group logic (illustratively, within-group logic 740, first-level across-group logic 760, second-level across group logic 750, and third-level across-group logic 730) and the combining logic 770 are somewhat arbitrary and a wide variety of boundary definitions are suitable. Additionally, certain logic functionality may be shared between logic blocks depicted in different drawings. For example, logic of depicted in both FIGS. 9 and 10 to group selection indications (e.g., SEL_grp[0], SEL_grp[1], SEL_grp[2], and SEL_grp[3]) arid group presence indications (e.g., Pgrp[4], Pgrp[5], Pgrp[6], and Pgrp[7]) may be shared among first-level across-group logic 760, second-level across-group logic 750, and third-level across-group logic 730.

Focusing illustratively on a single instance of scan logic, SU2 older scan logic 434*a*.1, implemented in accordance with FIGS. 7–10, includes presence indication logic 710 configured to provide a presence indication at those Op entries of Op entries 240 associated with a stage 2 StOp. Selection indications are supplied by instances of selection indication logic 720 to indicate the particular Op entry, if any, of Op entries 240 associated with a stage 2 LdOp (i.e., a LdOp in LU2 402). Based on the presence and selection indications, within-group logic 740 supplies within-group indications indicative of the stage 2 LdOp in one of the Op entries associated a group and the presence of a stage 2 StOp in an older Op entry of the same group. First-level across-group logic 760 supplies first-level across-group indications indicative of the stage 2 LdOp in one of the Op entries associated with a particular group and the presence of a stage 2 StOp in an Op entry associated with an adjacent older group. Analogously, second-level across-group logic 750 supplies second-level across-group indications indicative of the stage 2 LdOp in one of the Op entries associated with a pair of adjacent groups and the presence of a stage 2 StOp in an Op entry associated with an adjacent pair of older groups. Finally, third-level across-group logic 730 supplies third-level across-group indications indicative of the stage 2 LdOp in one of the Op entries associated with a set of four adjacent groups and the presence of a stage 2 StOp in an Op entry associated with an adjacent set of four older groups. An older stage 2 StOp indication is supplied from combining logic 770 (as the SC_SU2Older signal) if any of the within-group or across-group logic supply a corresponding older stage 2 StOp indication.

The design and operation of the remaining scan logic of load ordering logic 434*a* are similar. For example, within-group and across-group logic of SU1 older scan logic 434*a*.2 scan the entries of scheduler 180 and combining multiplexing logic 434*a*.5 supplies the SC_SU1Older signal to load hold logic 403. Similarly, within-group and across-group logic of SU0 older scan logic 434*a*.3 scan the entries of scheduler 180 and associated combining logic 434*a*.6 supplies the SC_SU0Older signal to load hold logic 403. Relative age indications (SC_SU2Older, SC_SU1Older, and SC_SU0Older) are supplied to load hold logic 403, which determines which SU address comparator signals (AddrMatch1 or AddrMatch2) to examine and, more generally, whether to hold up the stage 2 LdOp.

The scan logic instances for store ordering logic 434*b* are analogous. Focusing illustratively on a single instance of scan logic, LU2 older scan logic 434*b*.1, implemented in accordance with FIGS. 7–10, includes presence indication logic 710 configured to provide a presence indication at those Op entries of Op entries 240 associated with a stage 2 LdOp. Selection indications are supplied by instances of selection indication logic 720 to indicate the particular Op entry, if any, of Op entries 240 associated with a stage 2 StOp (i.e., a StOp in SU2 412). Based on the presence and selection indications, within-group logic 740 supplies within-group indications indicative of the stage 2 StOp in one of the Op entries associated with a particular group and the presence of a stage 2 LdOp in an older Op entry of the same group. First-level across-group logic 760 supplies first-level across-group indications indicative of the stage 2 StOp in one of the Op entries associated with a particular group and the presence of a stage 2 LdOp in an Op entry associated with an adjacent older group. Analogously, second-level across-group logic 750 supplies second-level across-group indications indicative of the stage 2 StOp in one of the Op entries associated with a pair of adjacent groups and the presence of a stage 2 LdOp in an Op entry associated with an adjacent pair of older groups. Finally, third-level across-group logic 730 supplies third-level across-group indications indicative of the stage 2 StOp in one of the Op entries associated with a set of four adjacent groups and the presence of a stage 2 LdOp in an Op entry associated with am adjacent set of four older groups. An older stage 2 LdOp indication is supplied from combining logic 770 (as the SC_LU2Older signal) if any of the within-group or across-group logic supply a corresponding older stage 2 LdOp indication.

The design and operation of remaining instances of scan logic of store ordering logic 434b are similar. In particular, within-group and across-group logic of LU1 older scan logic 434b.2 scan the entries of scheduler 180 and combining logic 434b.5 supplies the SC_LU1Older signal to store hold logic 413. Relative age indications (SC_LU2Older and SC_LU1Older) are supplied to store hold logic 413, which determines whether to examine the LU stage 2 address comparator (AddrMatch2) and whether to hold up the stage 2 StOp.

Op entry level Presence indications P[x] are based on the State[3:0] field (in particular, the S1, S2, and S3 bits) and Type[2:0] field (ST or LU) of an entry. For the three instances of LdOp scan logic, the ST type bit is used instead of the su bit. This distinguishes the StOps which actually reference memory from LEA operations which only generate logical addresses.

The Op entry equations which follow and which are labeled LUst2, LUst1, and LUst0 denote the P[x] terms corresponding to an Op entry, x, for the scan logic respectively enumerated above as SU2 older scan logic 434a.1, SU1 older scan logic 434a.2, and SU0 older scan logic 434a.3. Similarly, Op entry equations labeled SUld2 and SUld1 denote the P[x] terms corresponding to an Op entry, x, for the scan logic respectively enumerated above as LU2 older scan logic 434b.1 and LU1 older scan logic 434b.2.

Op Entry Equations

| | |
|---|---|
| LUst2: | ~P = ST ~S3 (S2 + S1 SU2_FirstAddrV) |
| LUst1: | ~P = ST ~S2 |
| LUst0: | ~P = ST ~S1 |
| SU1d2: | ~P = LU ~S3 (S2 + S1 LU2_FirstAddrV) |
| SU1d1: | ~P = LU ~S2 |

In the exemplary embodiment, (S2+S1 SU2_FirstAddrV) and (S2+S1 LU2_FirstAddrV) terms extend the Op entry equations to handle stalling of stage 1 LdStOps performing the first half of a misaligned memory access).

Figure 12:
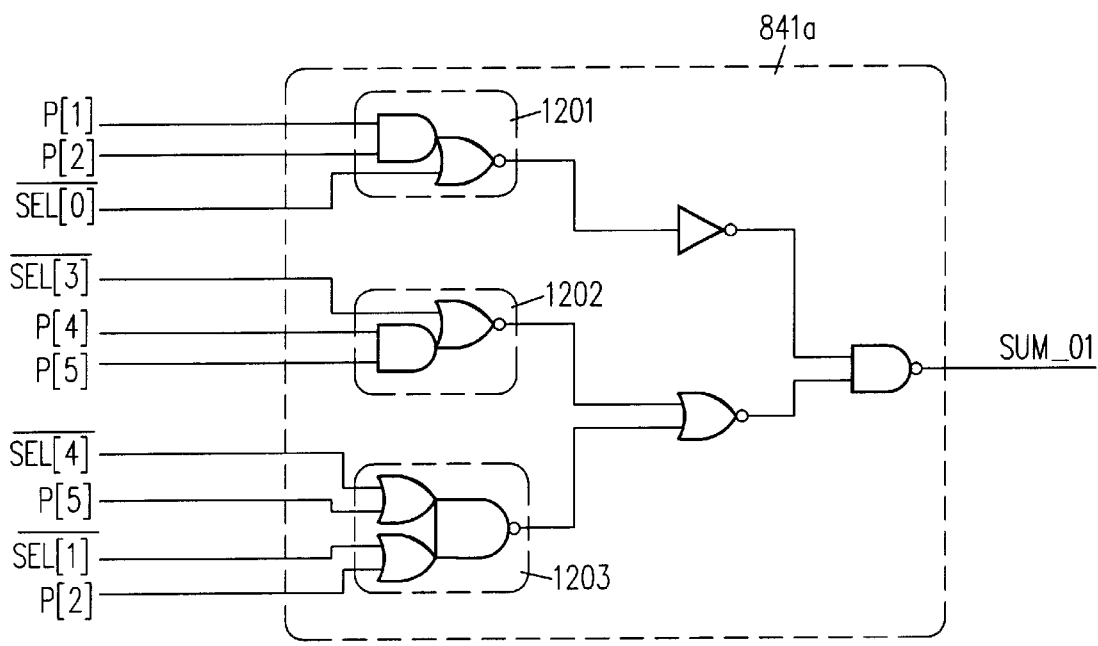
FIG. 12 is logic diagram depicting alternative scan and combining logic for improving speed path performance of Op quad 0 dependent portions of hierarchical scan logic.

Referring back to FIG. 8, an illustrative embodiment of scan and combining logic 841 including SUM_01 determining gates is depicted. The design of the illustrative embodiment is analogous to that of SUM_234 and SUM_567 determining gates which are also depicted. In an embodiment for handling a comparative slowness of entry indications for Op entries associated with a first Op quad, i.e., Op entries 0, 1, 2, and 3 of grp_0 and grp_1, alternative SUM_01 determining logic 841a is presently prefer-red. Such alternative SUM_01 determining logic 841a is shown in FIG. 12 and includes complex gates 1201, 1202 and 1203. Advantageously, alternative SUM_01 determining logic 841a imposes only 3 inverting gate delays in signal paths which depend on Op entry field values of Op quad 0, which are supplied from instruction decoder 140. In particular, alternative SUM_01 determining logic 841a provides a shorter signal path for signals dependent on Type[2:0] and State[3:0] field values of Ops 0, 1, 2, and 3, and in addition, allocates the faster inputs of complex gates 1201, 1202 and 1203 to those signals. In this way, the impact of Op entry arrival latencies is reduced.

Processor and System Embodiments

Figure 1:
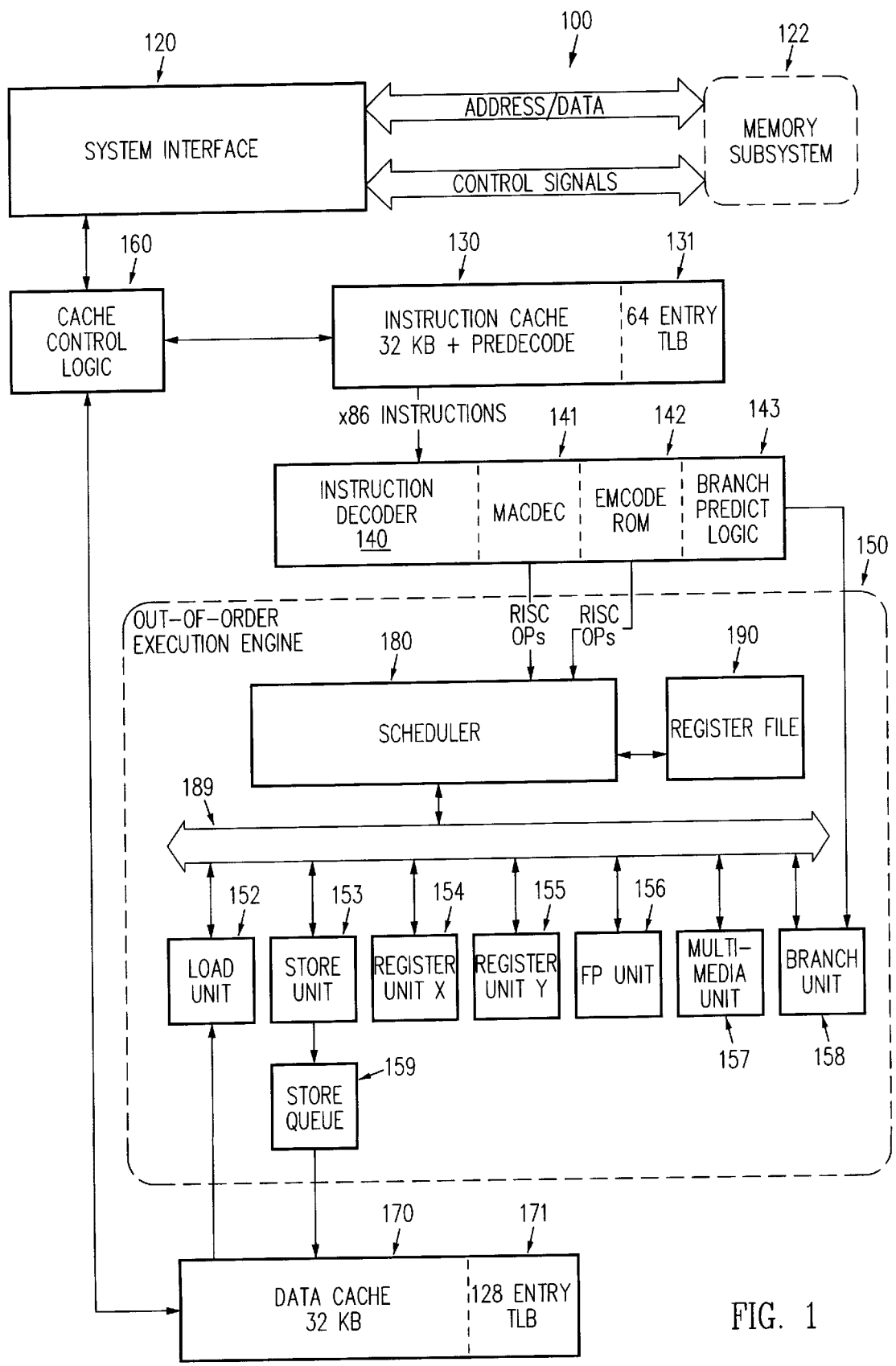
FIG. 1 is a block diagram of a superscalar computer processor providing out-of-order execution control in accordance with an embodiment of the present invention.

FIG. 1 depicts a superscalar processor embodiment of the present invention. Superscalar processor 100 includes an execution engine 150 which implements a reduced instruction set computing (RISC) architecture, an instruction decoder 140, caches, and a system interface 120 providing access to an address space represented in memory subsystem 122 and to devices on local busses (not shown).

Superscalar processor 100 includes a cache which, in the embodiment described herein, is organized as separate data and instruction portions. Data cache 170 and instruction cache 130 are coupled (through cache control logic 160 and via system interface 120) to the address space represented in memory subsystem 122 which includes main memory and optionally includes additional levels of cache, illustratively an L2 cache. Access to an L2 level cache, i.e., to L2 cache control logic and an L2 data portion (not shown), may be provided via system interface 120. Alternatively, L2 cache control logic may be interposed between cache control logic 160 (for L1) and system interface 120.

Cache system designs are well known in the art. In particular, suitable designs implementing split, "Harvard Architecture" instruction and data caches (such as 170 and 130) and multi-level cache hierarchies are well known in the cache arts. In most respects, the cache subsystem of superscalar processor 100 (i.e., data cache 170, 25 instruction cache 130, cache control logic 160, and an optional L2 cache) is of any such suitable design. However, for reasons apart from its caching performance, instruction cache 130 is integrated with pre-decode logic (not shown). Such integrated pre-decode logic identifies x86 instruction boundaries in the fetched instruction stream and facilitates the rapid decoding of instructions by instruction decoder 140. Integration of pre-decode logic with instruction cache 130 is described in greater detail in a co-pending United States patent application entitled, "Instruction Predecode and Multiple Instruction Decode," Ser. No. 08/592,207 naming Favor et al. as inventors, filed Jan. 26, 1996, now abandoned, and in the corresponding continuation-in-part U.S. Pat. No. 5,819,056, issued Oct. 6, 1998, the detailed descriptions of which are hereby incorporated by reference.

Referring again to FIG. 1, instruction sequences are loaded from the memory subsystem into instruction cache 130 for anticipated execution by execution engine 150. In accordance with the embodiment of processor 100 shown in FIG. 1, instructions in instruction cache 130 are CISC instructions selected from a complex instruction set such as the x86 instruction set implemented by processors conforming to the x86 processor architecture. Instruction decoder 140 converts CISC instructions received from instruction cache 130 to operations for execution engine 150. In the embodiment of FIG. 1, these operations are RISC-like operations (hereafter Ops) and a single x86 instruction from instruction cache 130 decodes into one or more Ops for execution engine 150. Individual Ops fall into one of several type groups including register operations (RegOps), load-store operations (LdStOps), load immediate value operations (LIMMOps), special operations (SpecOps), and floating point operations (FpOps). Alternative embodiments may decode different instruction sets and supply different operation types for execution.

Instruction decoder 140 includes two instruction translation portions, a hardware translation portion MacDec 141 and a ROM-based translation portion 142, together with branch prediction logic 143. Most common x86 instructions are translated into short sequences of 1 to 4 Ops using multiple parallel hardware decoders included in hardware translation portion 141. Hardware translation portion 141 decodes these common x86 instructions received from instruction cache 130 into short sequences of Ops which are then supplied to scheduler 180. Less common x86 instructions and those x86 instructions which translate into Op sequences longer than 4 Ops are translated by a ROM-based translation portion 142 which fetches (from ROM) a translated sequence of Ops corresponding to the particular x86 instruction to be translated. Translated Op sequences from either source, whether generated by hardware decoders or fetched from ROM, are supplied to scheduler 180 for execution by execution engine 150. The design and operation of instruction decoder 140 and the mapping of x86 instructions to RISC OPs are described in greater detail in a co-pending United States patent application entitled, "Instruction Predecode and Multiple Instruction Decode," Ser. No. 08/592,207 naming Favor et al. as inventors, filed Jan. 26, 1996, now abandoned, and in the corresponding continuation-in-part U.S. Pat. No. 5,819,056, issued Oct. 6, 1998, the detailed descriptions of which are hereby incorporated by reference.

Referring again to FIG. 1, execution engine 150 includes a scheduler 180, a register file 190, and multiple execution units which receive and execute Ops dispatched by scheduler 180. In the embodiment of FIG. 1, execution engine 150 includes seven execution units: load unit 152, store unit 153, register units 154 and 155, floating point unit 156, multimedia unit 157, and a branch unit 158, although alternative embodiments may add to or subtract from the set of execution units. In an exemplary embodiment, floating point unit 156 and multimedia unit 157 are omitted.

Execution engine 150 also includes a store queue 159 interposed between store unit 153 and data cache 170.

Scheduler 180 is organized as an ordered array of storage entries and logic blocks coupled thereto, which together provide support for out-of-order dispatch of Ops to execution units and for forwarding of Op results to one or more execution units. The ordered array of storage entries and logic blocks also implements a reorder buffer and provides for renaming of the architectural registers defined in register file 190 and speculative execution recovery. Instruction decoder 140 supplies scheduler 180 with new Ops decoded from the instruction stream. In turn, scheduler 180 stores and maintains (in a storage entry) data associated with each new Op received. In this way scheduler 180 tracks the status of each Op and its associated data as the Op is issued to, and executed by, an execution unit. After a given Op is fully executed and data dependencies have been resolved, it is retired and the corresponding scheduler entry is released.

Scheduler 180 is coupled to execution units (i.e., load unit 152, store unit 153, register units 154 and 155, floating point unit 156, multimedia unit 157, and branch unit 158) via a group of busses and control lines collectively shown as a bus 189. Scheduler 180 supplies Ops, register operands, and control signals to the execution units and receives result values and status indications back: from the execution units, illustratively via bus 189. Of course, all busses and control lines need not be fully connected and bus 189 is merely illustrative of the bi-directional coupling of scheduler 180 with the execution units.

Load unit 152 and store unit 153 execute LdStOps, respectively loading data from and storing data to addressable memory. Depending on the caching state of a particular memory address, a LdStOp may complete at the L1 data cache 170, at an L2 cache (not shown), or at main memory (also not shown). Store queue 159 temporarily stores data from store unit 153 so that store unit 153 and load unit 152 can operate in parallel without conflicting accesses to data cache 170. Register units 154 and 155 execute RegOps which operate on a data associated with the architectural registers of register file 190.

A wide variety of computer system configurations are envisioned, each embodying out-of-order load/store execution control in accordance with the present invention. For example, such a computer system (e.g., computer system 1000) includes a processor 100 providing out-of-order load/store execution control in accordance with the present invention, a memory subsystem (e.g., RAM 1020), a display adapter 1010, disk controller/adapter 1030, various input/output interfaces and adapters (e.g., parallel interface 1009, serial interface 1008, LAN adapter 1007, etc.), and corresponding external devices (e.g., display device 1001, printer 1002, modem 1003, keyboard 1006, and data storage). Data storage includes such devices as hard disk 1032, floppy disk 1031, a tape unit, a CD-ROM, a jukebox, a redundant array of inexpensive disks (RAID), a flash memory, etc.

While the invention has been described with reference to various embodiments, it will be understood that these embodiments are illustrative and that the scope of the invention is not limited to them. Many variations, modifications, additions, and improvements of the embodiments described are possible. For example, the organization of Op entries in scheduler 180 as Op quads is merely illustrative. Alternative embodiments may incorporate other structures and/or methods for representing the nature and state of operations in a computer having multiple and/or pipelined execution units. Scan logic may be configured to accommodate larger or smaller numbers of Op entries grouped in larger or smaller groups. In addition, a wide variety of gate-/complex-gate-level logic designs are suitable without departing from the hierarchical organization described herein.

Alternative embodiments may provide for a different distribution of structures and functionality within the load unit 152 and the store unit 153. For example, the load unit 152 and the store unit 153 may be independently modified to include larger or smaller numbers of execution stages. Corresponding changes to the desired set of scan logic instances will be apparent to persons of ordinary skill in the art. Structures for address comparison may be distributed differently between the load unit 152 and the store unit 153. Furthermore, alternate embodiments may incorporate larger or smaller numbers of scan logic instances for holding LdOps and StOps. Address comparison may be eliminated in favor of a more conservative hold policy. Additionally, structures and functionality presented as hardware in the exemplary embodiment may be implemented as software, firmware, or microcode in alternative embodiments. These and other variations, modifications, additions, and improvements may fall within the scope of the invention as defined in the claims which follow.

What is claimed is:

1. Scan chain logic for allowing load-type and store-type instructions to execute generally out-of-order with respect to each other while enforcing data dependencies between said load-type and store-type instructions, said scan chain logic comprising:

an AND-tree of propagate signals, the AND-tree supplying a plurality of carry-in signals in response to propagate signals, wherein the propagate signals are functions of operand type and operand state indications from corresponding entries in a scheduler array; and multiplexing logic coupled to the AND-tree to receive the carry-in signals, the multiplexing logic selective for a particular one of the carry-in signals corresponding to a load/store entry in the scheduler array.

2. Scan chain logic, as recited in claim 1, wherein the load/store entry is associated with a load operation and the propagate signals are indicative of the presence, in a corresponding entry of the scheduler array, of the load operation;

wherein the AND-tree supplies a plurality of group carry-in signals in response to the propagate signals, the group carry-in signals corresponding to a group of entries in the scheduler array; and wherein the multiplexing logic comprises:
group logic blocks each responsive to a first conjunction between the corresponding group carry-in signal and any of a plurality of selection signals indicating the presence of the load operation within the group of entries in the scheduler array, each of the group logic blocks also responsive to a second conjunction between one of the propagate signals and a corresponding one of the selection signals; and an OR-structure coupled to each of the group logic blocks and supplying a store older indication indicating the presence, in the scheduler array, of at least one store operation older than the load operation.

3. Scan chain logic, as recited in claim 1, wherein the load/store entry is associated with a store operation and the propagate signals are indicative of the presence, in a corresponding entry of the scheduler array, of the store operation;

wherein the AND-tree supplies a plurality of group carry-in signals in response to the propagate signals, the group carry-in signals corresponding to a group of entries in the scheduler array; and wherein the multiplexing logic comprises:
group logic blocks each responsive to a first conjunction between the corresponding group carry-in signal and any of a plurality of selection signals indicating the presence of the store operation within the group of entries in the scheduler array, each of the group logic blocks also responsive to a second conjunction between one of the propagate signals, and a corresponding one of the selection signals; and an OR-structure coupled to each of the group logic blocks and supplying a load older indication indicating the presence, in the scheduler array, of at least one load operation older than the store operation.

4. Scan chain logic, as recited in claim 1, wherein the AND-tree includes earlier and later stages, the earlier stages implemented as alternating stages of NAND and NOR gates and the later stages implemented as NAND-inverter pairs wherein the inverters are spaced to improve the signal rise time characteristics along generally longer lines connecting the later stages.

5. Scan chain logic, as recited in claim 1, wherein the AND-tree includes delay elements along certain of the carry-in signal paths to substantially equalize aggregate delays along all of the carry-in signal paths.

6. A method for allowing first- and second-type operations to execute generally out-of-order with respect to each other while enforcing data dependencies between said first- and second-type operations, said method comprising:

maintaining an age ordered sequence of operation entries corresponding to operations;

scanning said age ordered sequence of operation entries for a first-type operation entry, said scanning being from an oldest entry to at least a selected second-type operation entry thereof;

supplying, based on said scanning, a first-type older indication indicative of presence in said age ordered sequence, of an operation entry corresponding to an older first-type operation relative to a selected second-type operation; and responsive to said first-type older indication, selectively inhibiting execution of said selected second-type operation in a corresponding execution unit.

7. A method, as recited in claim 6, wherein said scanning includes at least one propagate-kill scan, said at least one propagate-kill scan being initiated in correspondence with said selected second-type operation;

killed in correspondence with said older first-type operation, if any; and indicative, if not killed, of said presence in said age ordered sequence, of said operation entry corresponding to said older first-type operation relative to said selected second-type operation.

8. A method, as recited in claim 7, wherein said scanning further includes at least a second propagate-kill scan; and wherein said selectively inhibiting is unconditionally responsive to an older first-type operation indication, if any, of said second propagate-kill scan but, in the case of said first propagate-kill scan, is conditionally responsive depending on an at least partial address match between memory addresses corresponding to said first-type and said second-type operations.

9. A method, as recited in claim 6, wherein said first-type operations are load-type operations; and wherein said second-type operations are store-type operations and said selected second-type operation is a store-type operation in an execution stage of a store unit.

10. A method, as recited in claim 6, wherein said first-type operations are store-type operations; and wherein said second -type operations are load-type operations and said selected second-type operation is a load-type operation in an execution stage of a load unit.

11. A method, as recited in claim 6, wherein said first-type operations is one of a load-type and a store-type operation;

wherein said second-type operation is the other is one of said load-type and said store-type operation; and wherein said selected second-type operation is in an execution stage of said corresponding execution unit.

12. A method, as recited in claim 6, wherein said selectively inhibiting further depends on an at least partial address match between memory addresses corresponding to said first-type and said second-type operations.

13. A method, as recited in claim 6, wherein said maintaining includes maintaining operation type and operation state fields for each entry of said age ordered sequence of operation entries; and wherein said scanning includes generating operation entry terms, including terms for said first-type operation entry and said selected second-type operation entry, based on corresponding of said operation type and operation state fields.

14. A method for allowing a store operation to execute generally out-of-order with respect to load operations while enforcing data dependencies therebetween, said method comprising:

maintaining an age ordered sequence of operation entries corresponding to operations, including said load and said stoic operations;

scanning said age ordered array of operation entries for a load operation entry, said scanning being from an oldest entry thereof to at least a selected store operation entry thereof;

supplying, based on said scanning, a load older indication indicative of presence in said age ordered array, of an older load operation entry relative to said selected store operation entry; and responsive to said load older indication, selectively inhibiting execution of said selected store operation.

15. A method, as recited in claim 14, wherein said scanning includes at least one propagate-kill scan, said at least one propagate-kill scan being initiated at said selected store operation entry;

killed at said older load operation entry, if any; and indicative, if not killed, of said presence in said age ordered sequence, of said older load operation relative to said selected store operation.

16. A method, as recited in claim 14, wherein said scanning further includes at least a second propagate-kill scan; and wherein said selectively inhibiting includes in the case of said first propagate-kill scan, conditionally inhibiting on said load older indication in conjunction with an at least partial address match between memory addresses corresponding to said selected store and to said load operations, and in the case of said second propagate-kill scan, unconditionally inhibiting on a second load older indication therefrom.

17. A method, as recited in claim 14, wherein said selected store operation entry corresponds to a store operation in an execution stage of an execution unit therefor.

18. A method for allowing a load operation to execute generally out-of-order with respect to store operations while enforcing data dependencies therebetween, said method comprising:

maintaining an age ordered sequence of operation entries corresponding to operations, including said load and said store operations;

scanning said age ordered array of operation entries for a store operation entry, said scanning being from an oldest entry thereof to at least a selected load operation entry thereof;

supplying, based on said scanning, a store older indication indicative of presence in said age ordered array, of an older store operation entry relative to said selected load operation entry; and responsive to said store older indication, selectively inhibiting execution of said selected load operation.

19. A method, as recited in claim 18, wherein said scanning includes at least one propagate-kill scan, said at least one propagate-kill scan being initiated at said selected load operation entry;

killed at said older store operation entry, if any; and indicative, if not killed, of said presence in said age ordered sequence, of said older store operation relative to said selected load operation.

20. A method, as recited in claim 18, wherein said scanning further includes at least a second propagate-kill scan; and wherein said selectively inhibiting includes in the case of said first propagate-kill scan, conditionally inhibiting on said store older indication in conjunction with an at least partial address match between memory addresses corresponding to said selected load and to said store operations, and in the case of said second propagate-kill scan, unconditionally inhibiting on a second store older indication therefrom.

21. A method, as recited in claim 18, wherein said selected load operation entry corresponds to a load operation in an execution stage of an execution unit therefor.

22. An apparatus comprising:

an age ordered store for operation entries corresponding to operations, including first-type and second-type operations;

first lookahead scan means for scanning said age ordered store for a first-type operation entry and supplying, based on said scanning, a first-type older indication indicative of presence in said age ordered store, of an older first-type operation entry relative to a selected second-type operation entry thereof, said first lookahead scan means scanning from an oldest entry thereof to at least said selected second-type operation entry; and an execution unit responsive to said first-type older indication to selectively inhibit execution of said selected second-type operation thereby.

23. An apparatus, as recited in claim 22, further comprising at least second lookahead scan means; and wherein said selectively inhibiting by said first lookahead scan means includes conditionally inhibiting on said first-type older indication in conjunction with an at least partial address match between identifiers corresponding to said selected second-type and to said first-type operations, and wherein said second lookahead scan means supplies a second store older indication and said execution unit unconditionally inhibits execution of said selected second-type operation in response thereto.

24. An apparatus, as recited in claim 22, wherein said first-type operations is one of a load-type and a store-type operation;

wherein said second-type operation is the other one of said load-type and said store-type operation.

25. An apparatus comprising:

an age ordered store for operation entries corresponding to operations, including first-type and second-type operations;

first hierarchical scan means for scanning said age ordered store for a first-type operation entry and supplying, based on said scanning, a first-type older indication indicative of presence in said age ordered store of an older first-type operation entry relative to a selected second-type operation entry thereof, said first hierarchical scan means scanning from an oldest entry thereof to at least said selected second-type operation entry; and an execution unit responsive to said first-type older indication to selectively inhibit execution of said selected second-type operation thereby.

26. An apparatus, as recited in claim 25, further comprising at least second hierarchical scan means; and wherein said selectively inhibiting by said first hierarchical scan means includes conditionally inhibiting on said first-type older indication in conjunction with an at least partial address match between identifiers corresponding to said selected second-types and to said first-type operations, and wherein said second hierarchical scan means supplies a second store older indication and said execution unit unconditionally inhibits execution of said selected second-type operation in response thereto.

27. An apparatus, as recited in claim 25, wherein said first-type operations is one of a load-type and a store-type operation;

wherein said second-type operation is the other one of said load-type and said store-type operation.

28. An apparatus comprising:

an age ordered store for operation entries corresponding to operations, including first-type and second-type operations;

scan chain means for scanning said age ordered store for a first-type operation entry and supplying, based on said scanning, a first-type older indication indicative of presence in said age ordered store, of an older first-type operation entry relative to a selected second-type operation entry thereof, said scan chain means scanning from an oldest entry thereof to at least said selected second-type operation entry; and an execution unit responsive to said first -type older indication to selectively inhibit execution of said selected second-type operation thereby.

29. An apparatus, as recited in claim 28, wherein said scan chain means includes at least first lookahead scan chain logic.

30. An apparatus, as recited in claim 28, wherein said scan chain means includes at least first hierarchical scan chain logic.

* * * * *